United States Patent
Hara et al.

(10) Patent No.: US 6,199,111 B1
(45) Date of Patent: *Mar. 6, 2001

(54) CLIENT-LED NETWORK COMPUTING SYSTEM AND ITS METHOD

(75) Inventors: Hirotaka Hara; Takahide Matsutsuka; Nobuyuki Kanaya; Takao Okubo; Sanya Uehara, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/972,363

(22) Filed: Nov. 18, 1997

(30) Foreign Application Priority Data

Apr. 30, 1997 (JP) .................................................. 9-112781

(51) Int. Cl.[7] .............................. G06F 13/42; G06F 11/30
(52) U.S. Cl. .......................... 709/227; 709/223; 709/224; 709/226
(58) Field of Search .................................. 709/227, 300, 709/224, 226, 223, 217, 219, 240; 370/352

(56) References Cited

U.S. PATENT DOCUMENTS

| 5,689,645 | * | 11/1997 | Schettler et al. | 709/226 |
| 5,758,084 | * | 5/1998 | Silverstein et al. | 709/227 |
| 5,835,724 | * | 11/1998 | Smith | 709/227 |
| 5,841,981 | * | 11/1998 | Kondo | 709/223 |
| 5,852,724 | * | 12/1998 | Glenn, II et al. | 709/226 |
| 5,867,495 | * | 2/1999 | Elliott et al. | 370/352 |
| 5,872,932 | * | 2/1999 | Schettler et al. | 709/226 |
| 5,875,296 | * | 2/1999 | Shi et al. | 709/224 |
| 5,913,061 | * | 6/1999 | Gupta et al. | 709/300 |
| 5,948,069 | * | 9/1999 | Kitai et al. | 709/240 |
| 6,101,508 | * | 8/2000 | Wolff | 709/226 |

FOREIGN PATENT DOCUMENTS

| 5-250298 | 9/1993 | (JP) . |
| 8-87463 | 4/1996 | (JP) . |

OTHER PUBLICATIONS

Shim et al., "Monitoring and control of distributed systems", Proceedings of the First International Conference on Systems Integration, pp. 672–681, Apr. 1990.*

Parris et al., "A dynamic management scheme for real–time connections", IEEE INFOCOM, vol. 2, pp. 698–707, Jun. 1994.*

HyeongJu et al., "Web application based on ATM in Korea", International Conference on Communication Technology Proceedings, vol. 2, pp. 1057–1060, May 1996.*

Himonas et al., "A multiple access control protocol for an interactive multimedia network", Global Telecommunications Conference, vol. 1, pp. 262–266, Nov. 1996.*

* cited by examiner

Primary Examiner—Mark Rinehart
Assistant Examiner—Almari Romero
(74) Attorney, Agent, or Firm—Staas & Halsey LLP

(57) ABSTRACT

In a distributed client-server system a client is connected to an arbitrary server using a communication module common to a plurality of servers and it uses data, etc. of each server by switching over its connection. At this time basically there is no need for communication and the replication of data between the servers.

27 Claims, 21 Drawing Sheets

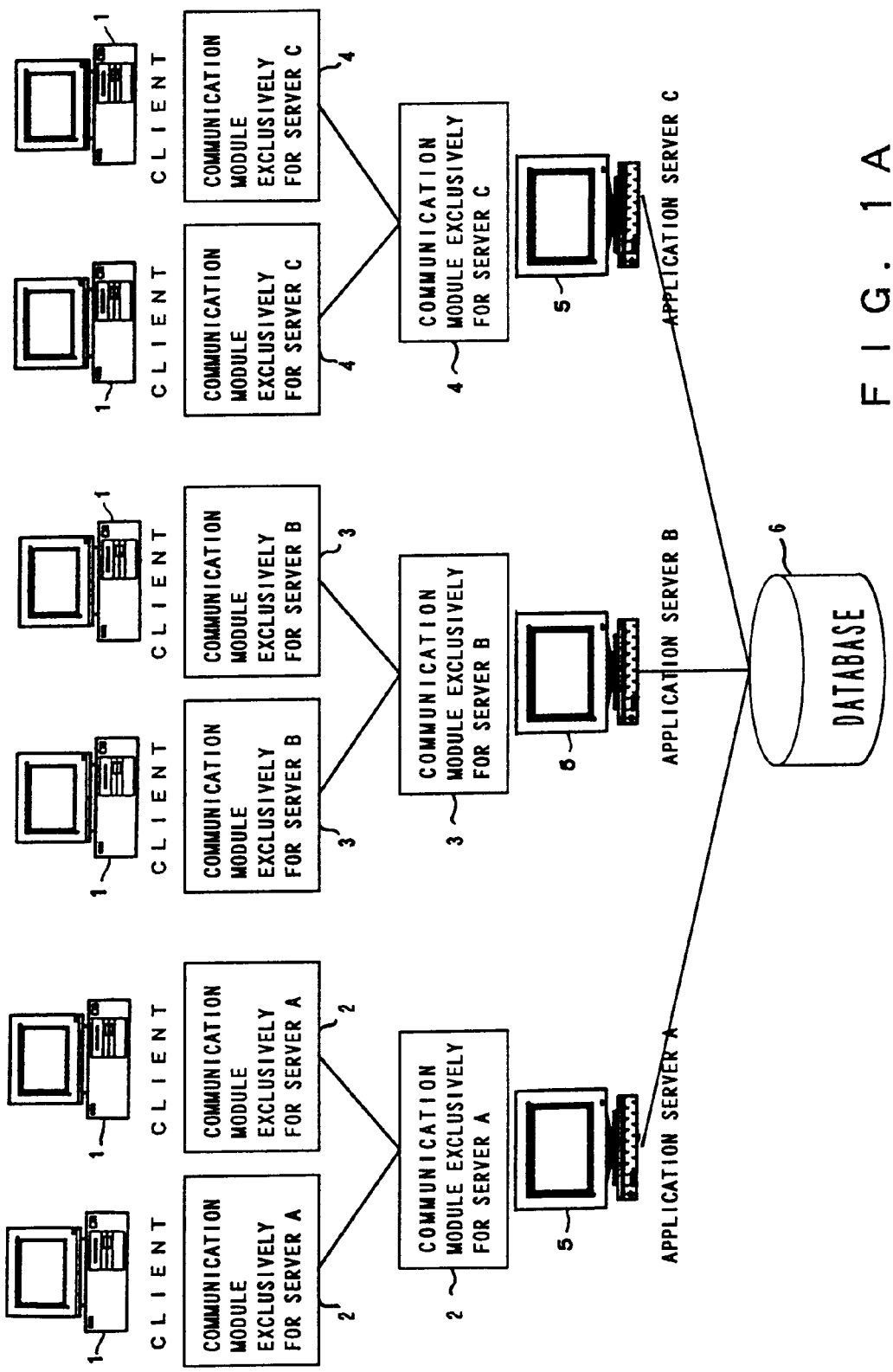

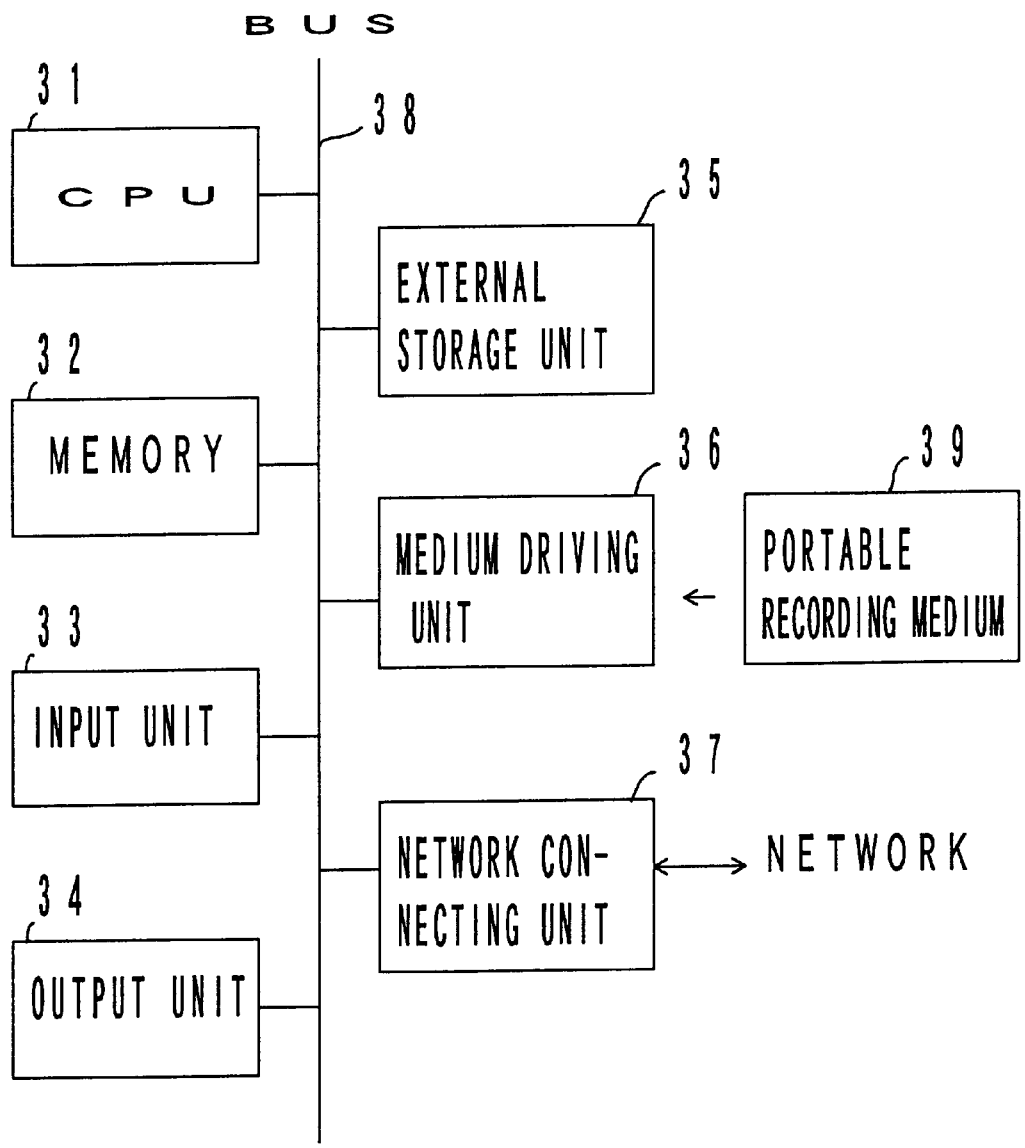
F I G. 3

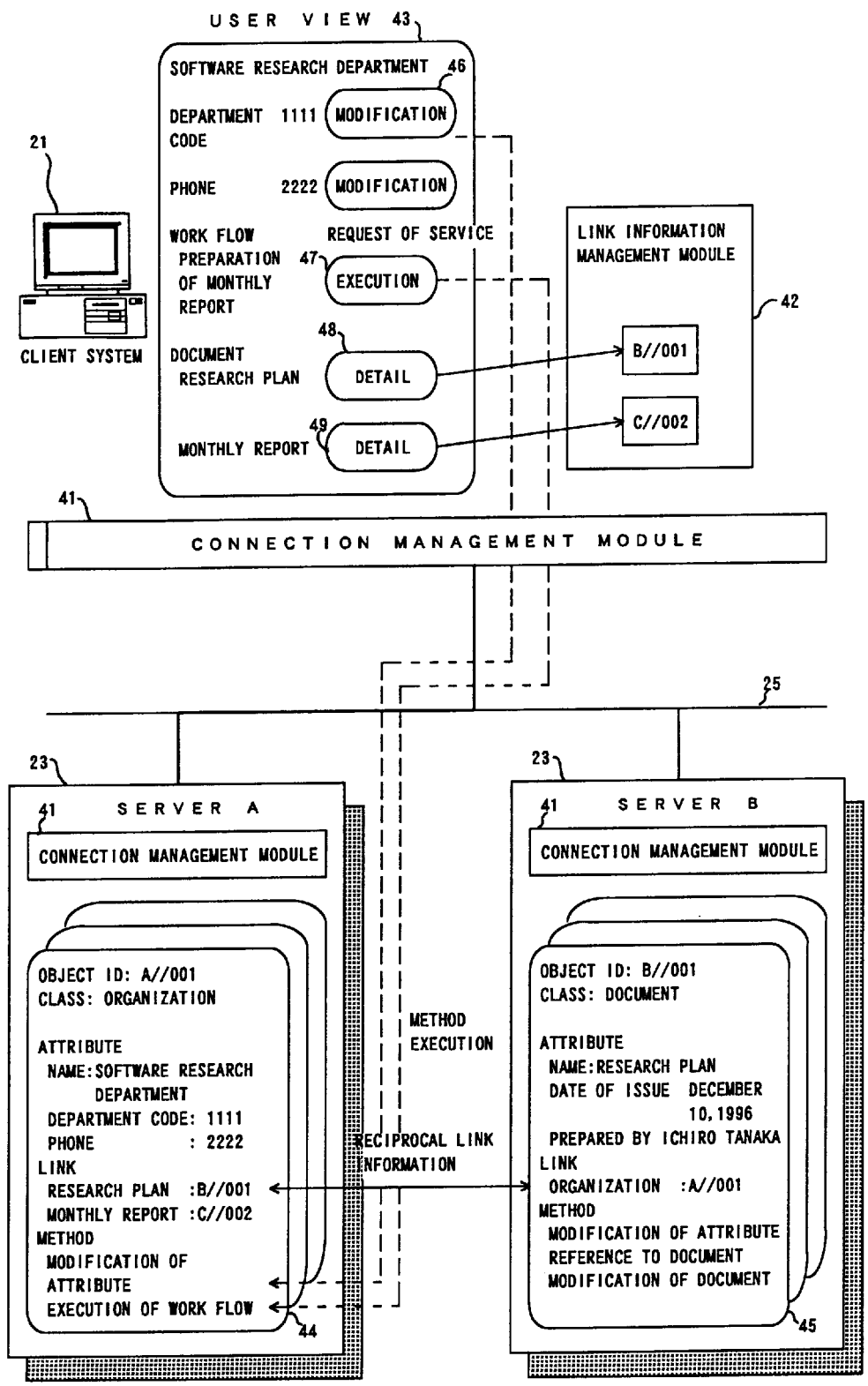
F I G. 4

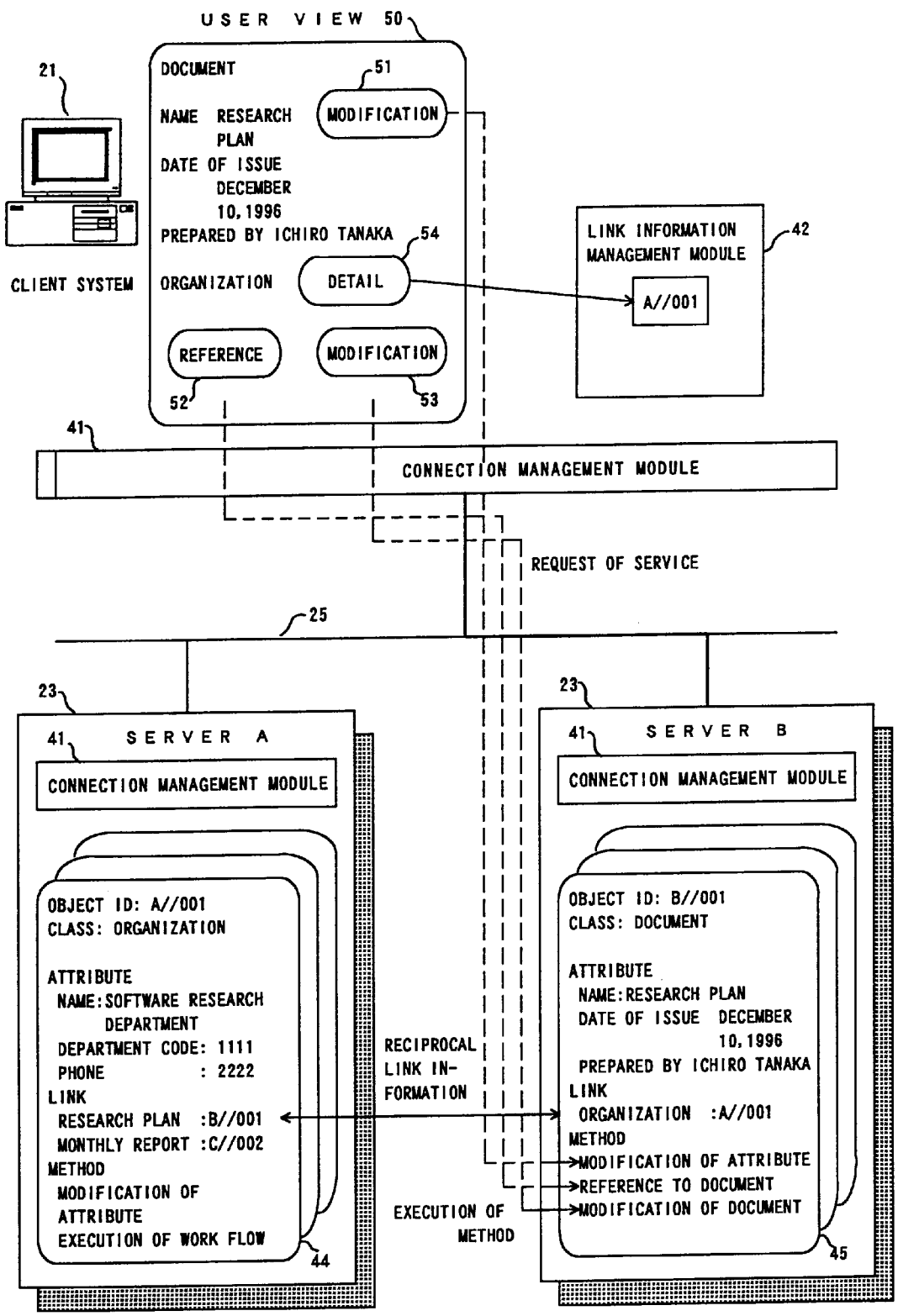
F I G. 6

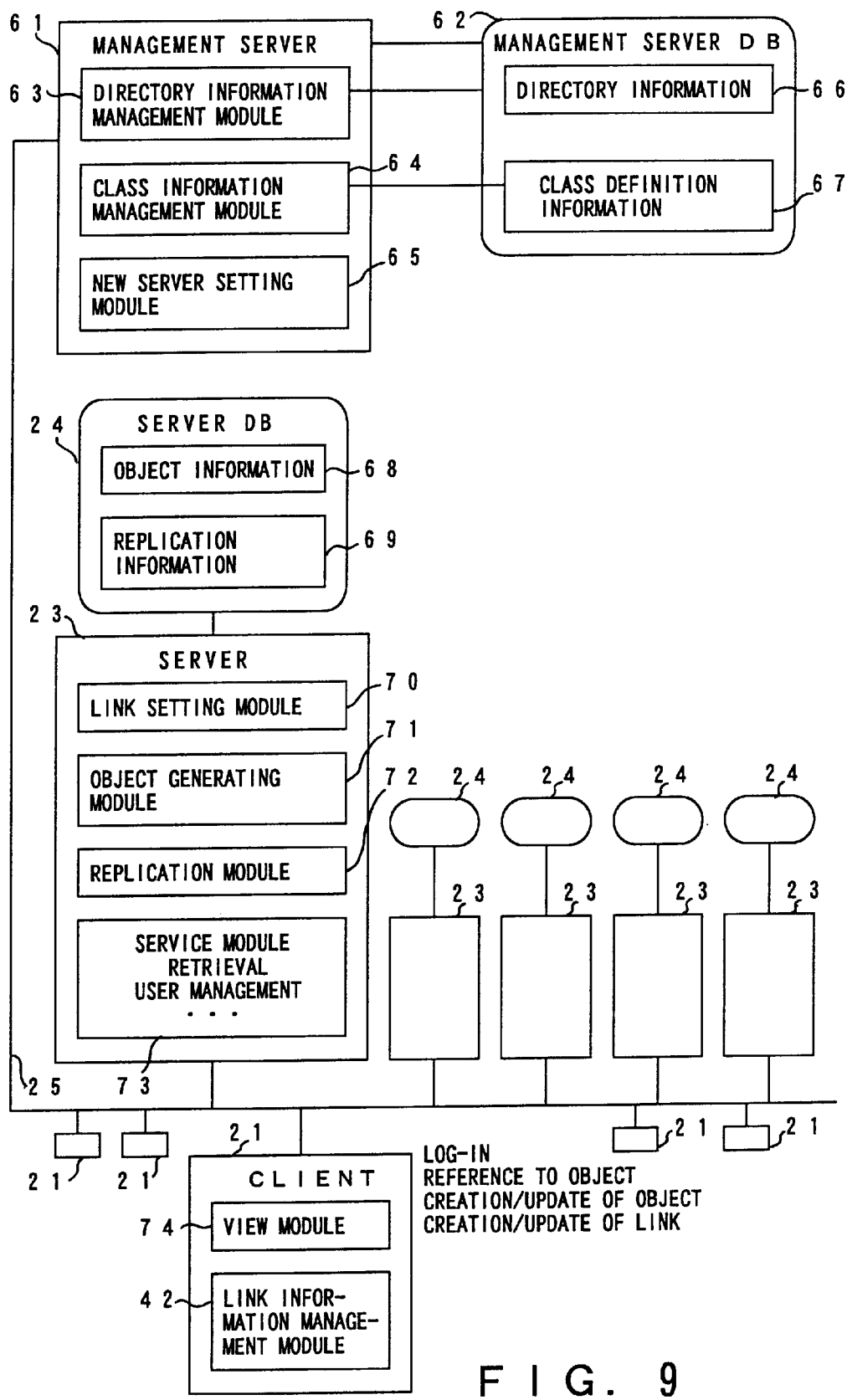
F I G. 9

| CLASS | OBJECT NAME | ADDRESS |
|---|---|---|
| ORGANIZATION | RESEARCH CENTER | RESEARCH CENTER SERVER//1001 |
| ORGANIZATION | SOFTWARE RESEARCH | SOFTWARE RESEARCH SERVER//1002 |
| ORGANIZATION | SEMICONDUCTOR RESEARCH | RESEARCH CENTER SERVER//1003 |
| INDIVIDUAL | TARO YAMADA | SOFTWARE DEVELOPMENT SERVER//1004 |
| INDIVIDUAL | KENICHI SUZUKI | RESEARCH CENTER SERVER//1005 |
| SERVER | RESEARCH CENTER SERVER | RESEARCH CENTER SERVER//1006 |
| SERVER | SOFTWARE RESEARCH SERVER | SOFTWARE RESEARCH SERVER//1007 |
| SERVER | SOFTWARE DEVELOPMENT SERVER | SOFTWARE DEVELOPMENT SERVER //1008 |
| SERVER | SEMICONDUCTOR RESEARCH SERVER | SEMICONDUCTOR RESEARCH SERVER //1009 |

FIG. 10

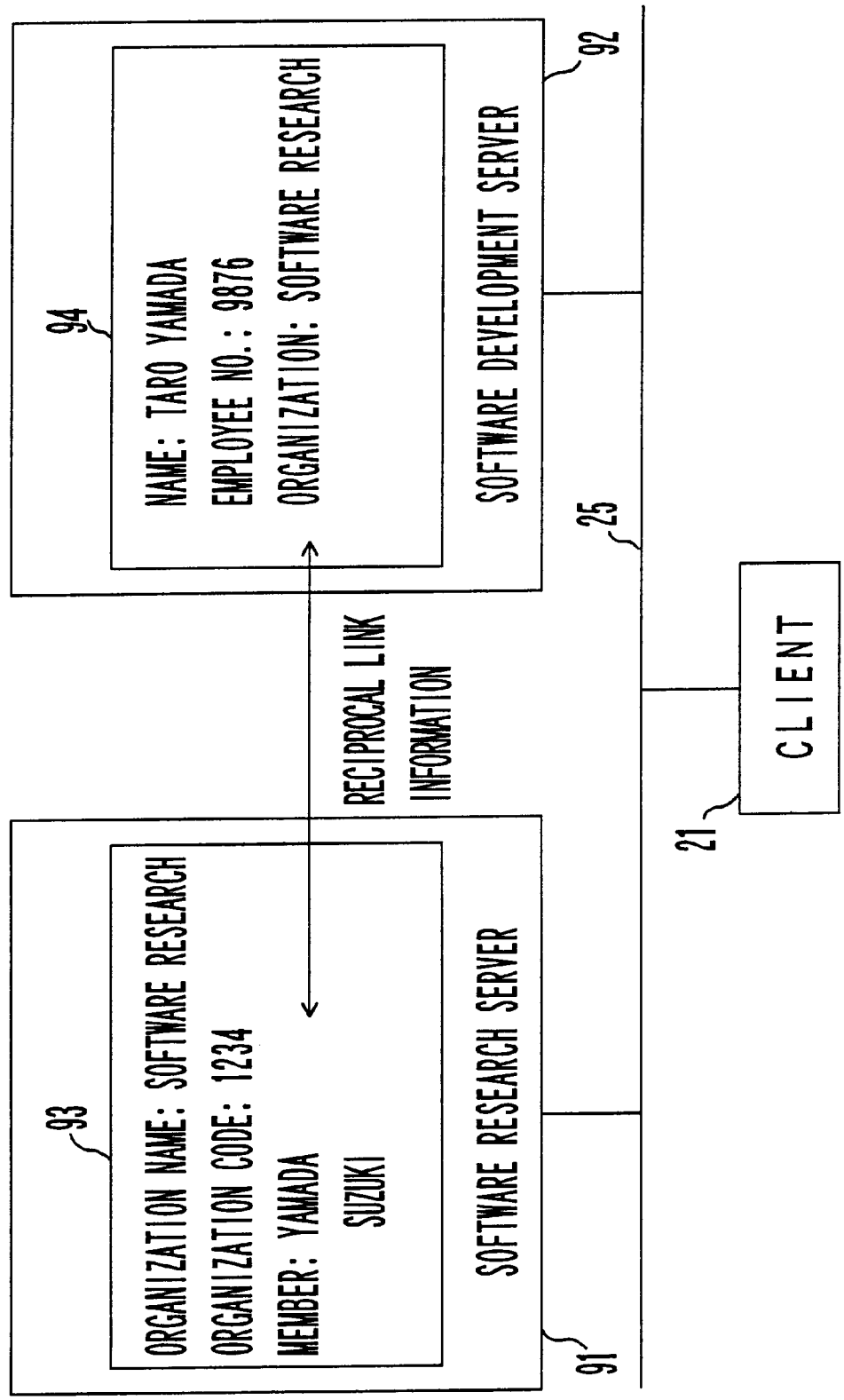
F I G. 13

FIG. 15

ORGANIZATION NAME     SOFTWARE RESEARCH

ORGANIZATION CODE     1 2 3 4

MEMBER                YAMAMOTO
                      SUZUKI

NEW MEMBER

| | |
|---|---|
| NAME | TARO YAMADA |
| EMPLOYEE NO. | 9876 |
| ORGANIZATION | SOFTWARE RESEARCH |
| PROJECT | BROWSER DEVELOPMENT |
| | SERVER DEVELOPMENT |
| RELATED DOCUMENT | DEPARTMENT MEETING MATERIAL |
| | DEVELOPMENT SPECIFICATION |

FIG. 16

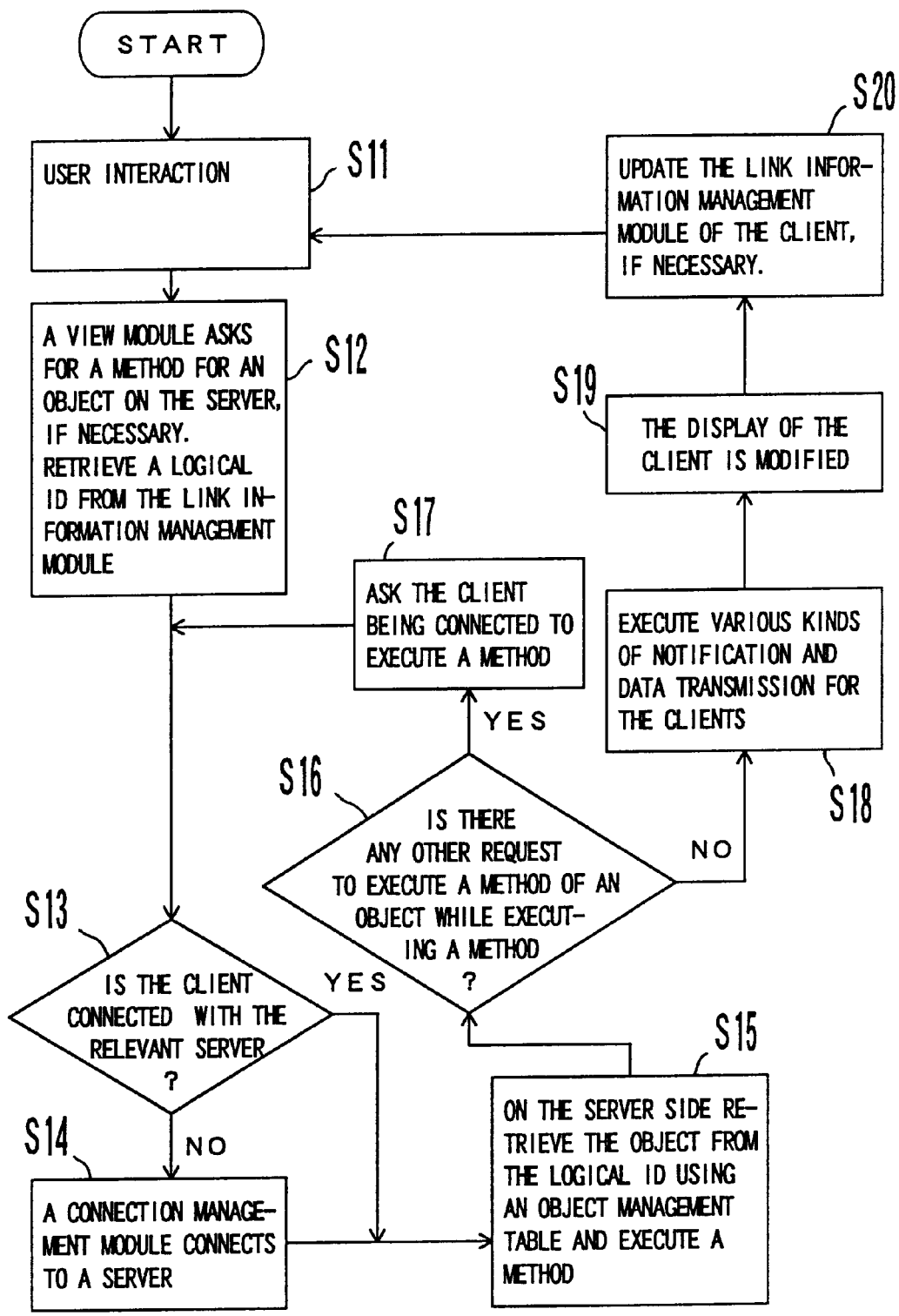
F I G. 17

CLIENT-LED NETWORK COMPUTING SYSTEM AND ITS METHOD

BACKGROUND OF THE INVENTION

1. Field of the Invention

The present invention relates to a network computing system for updating and adding data in a distributed client-server system through a network, and its method.

2. Description of the Related Art

In the conventional information system it was common to process a single huge database on a transaction by transaction basis. However, today, with the development of a computing system and networking, it has become necessary to construct an information system in which data is frequently updated and added among widely distributed systems. With the fusion between a LAN (Local Area Network) and a global network, data processing in a form of network computing centering around network is also being realized.

FIG. 1A is a block diagram of the conventional client-server system. The system in FIG. 1A comprises clients 1, application servers 5 (application servers A, B and C) and a database 6. The application servers A, B and C share the database 6 among them, and are provided with a server A exclusive communication module 2, a server B exclusive communication module 3 and a server C exclusive communication module 4 respectively, in order to communicate with the clients 1.

A client 1 is provided with one of the server A exclusive communication module 2, the server B exclusive communication module 3, and the server C exclusive communication module 4, and updates the database 6, etc. connected to a specific application server 5 having a corresponding communication module.

Furthermore, with the recent huge increase in size of the database 6 and the decentralization of systems, the database 6 has been distributed as shown in FIG. 1B. In the system of FIG. 1B, each of the application servers A, B and C manages an individual database 6. Also in this system, the clients 1 are connected only to specific application servers 5 using one of the server A exclusive communication module 2, the server B exclusive communication module 3, and the server C exclusive communication module 4.

For this reason, when a client 1 accesses the data in the database 6 of a server 5 different from the application server 5 of the connected party, replication of data is made between the relevant databases 6, or a remote procedure call (RPC) is made between the application servers 5. In the case of the replication, data is copied between different databases 6, and in the case of an RPC, a function call is made and the necessary data are exchanged between the application servers 5.

What is common to the systems shown in FIGS. 1A and 1B is that a client 1 is designed to be connected with a specific application server 5 by using communication modules 2, 3 and 4.

On the Internet, which has recently become popular, a world wide web (WWW) has been developed and is widely used as a means for sourcing information. The characteristics of a WWW are that any client (WWW browser) can be connected to any server (WWW server) by a common protocol called hypertext transfer protocol (HTTP). A WWW is provided with a hyperlink function for embedding a link to a hypertext markup language (HTML) document in a server, in a HTML document in another server. Here, a HTML document corresponds to a file sent from a server to a client.

FIG. 1C is a flowchart showing the operation of a client and a server on a WWW. When the client starts operating and the user clicks a link on the screen (step S1), the client is connected to the corresponding server using the HTTP (step S2).

Thus, the corresponding HTML document is sent from the server to the client (step S3), and the connection with the server is cut (step S4) and the data of the HTML document is displayed on the screen (step S5). When the user clicks a displayed link on the screen again, the operation of steps S1 to S5 is repeated.

However, the conventional information system described above has the following problems.

In such a conventional client-server system as shown in FIGS. 1A or 1B, since a client 1 can be connected with a specific server 5 only, the function of other servers 5 distributed on the network cannot be directly used.

For this reason the server 5 of the connected party of the client 1 has to be connected with another server 5 and has to ask for a necessary process, which generates many transactions between the servers 5. When replication is needed between databases 6, too, this process becomes complicated in the same way.

In this way, since the control of the processes between servers 5 and databases 6 becomes complicated, it is impossible to construct such a large-scale distributed system that allows servers 5 and databases 6 to be spread all over the world, such as in a WWW.

The conventional WWW also has a problem that it is provided with only a simple function of sending an HTML document on a client's request. Particularly, since its session is cut after every transmission of one page in HTTP, the communicating state (connecting state) cannot be held. Accordingly, it is difficult to develop a client-server system for performing a real interaction only with the basic functions of a WWW.

Furthermore, since in a WWW the creation/modification of a page and link is left to each individual, the entire configuration of a WWW cannot be determined. For example, it has the following problems.

1. It is difficult to create the entity data (object) of a new page on an arbitrary distributed server.

2. In registering a new object the link from an existing object cannot be updated/managed.

3. When deleting an object, a destination of a link is often lost (dead link).

4. Although a program such as a WWW robot is developed as a means for retrieving information desired by a user, a search using a keyword must be performed for all objects, because there is no linking configuration between the objects.

SUMMARY OF THE INVENTION

It is an object of the present invention to provide a network computing system in which the update and addition of data can be easily made, in a distributed client-server system through a network and its method.

The network computing system of the present invention manages distributed data in a distributed system through a communication network.

In the first aspect of the present invention a client side is provided with a common communication unit and a connection management unit. The common communication unit controls the communication between a client and a plurality of servers on the network and can access the plurality of servers commonly. When a client is connected to the first server out of the plurality of servers, the connection management unit connects the client to the second server out of the plurality of servers, if necessary, while holding the connecting state of the client with the first server, and enables the client to receive services from the second server.

The common communication unit is not for communicating with a specific server as it is conventionally, and it can communicate with all the servers on the network commonly. For example, it is assumed that it has become necessary to ask the second server for a process when a client is connected to the first server under the control of the common connection unit. In this case the client is connected to the second server under the control of the connection management unit while it is still connected with the first server, and the client receives services from the second server.

In the second aspect of the present invention a server side is also provided with a common communication unit and a connection management unit. The common communication unit controls the communication between the first server and a client on the network, and receives an access from the client. The connection management unit connects the client to the second server, if necessary, while it holds the connecting state of the client with the first server, and sends out link information for receiving services from the second server to the client.

The common communication unit does not correspond exclusively to each server as it is conventionally, but is common to all the servers on the network. For example, it is assumed that it has become necessary to ask the second server for a process when a client is connected to the first server under the control of the common connection unit. In this case, link information for accessing the second server is sent to the client under the control of the connection management unit. The client is connected to the second server using the received link information while it is still connected with the first server, and the client receives services from the second server.

In this way, if the system of the present invention is used, basically communication between servers becomes unnecessary, and the communication control on the server side becomes simple. Accordingly, a large scale distributed system can be comparatively easily constructed.

BRIEF DESCRIPTION OF THE DRAWINGS

FIG. 1A is a block diagram of the conventional client-server system.

FIG. 3 is a block diagram of the information processing apparatus.

FIG. 4 is a drawing showing the connecting state with a server.

FIG. 6 is a drawing showing the state after the establishment of the connection with another server.

FIG. 9 is a drawing showing the module configuration.

FIG. 10 shows an example of directory information.

FIG. 13 is a drawing showing the referring operation of object information by a client.

FIG. 15 shows an example of a client screen.

FIG. 16 is a drawing of a log-in screen.

FIG. 17 is a flowchart showing the network computing operation.

DESCRIPTION OF THE PREFERRED EMBODIMENTS

Figure 1B:
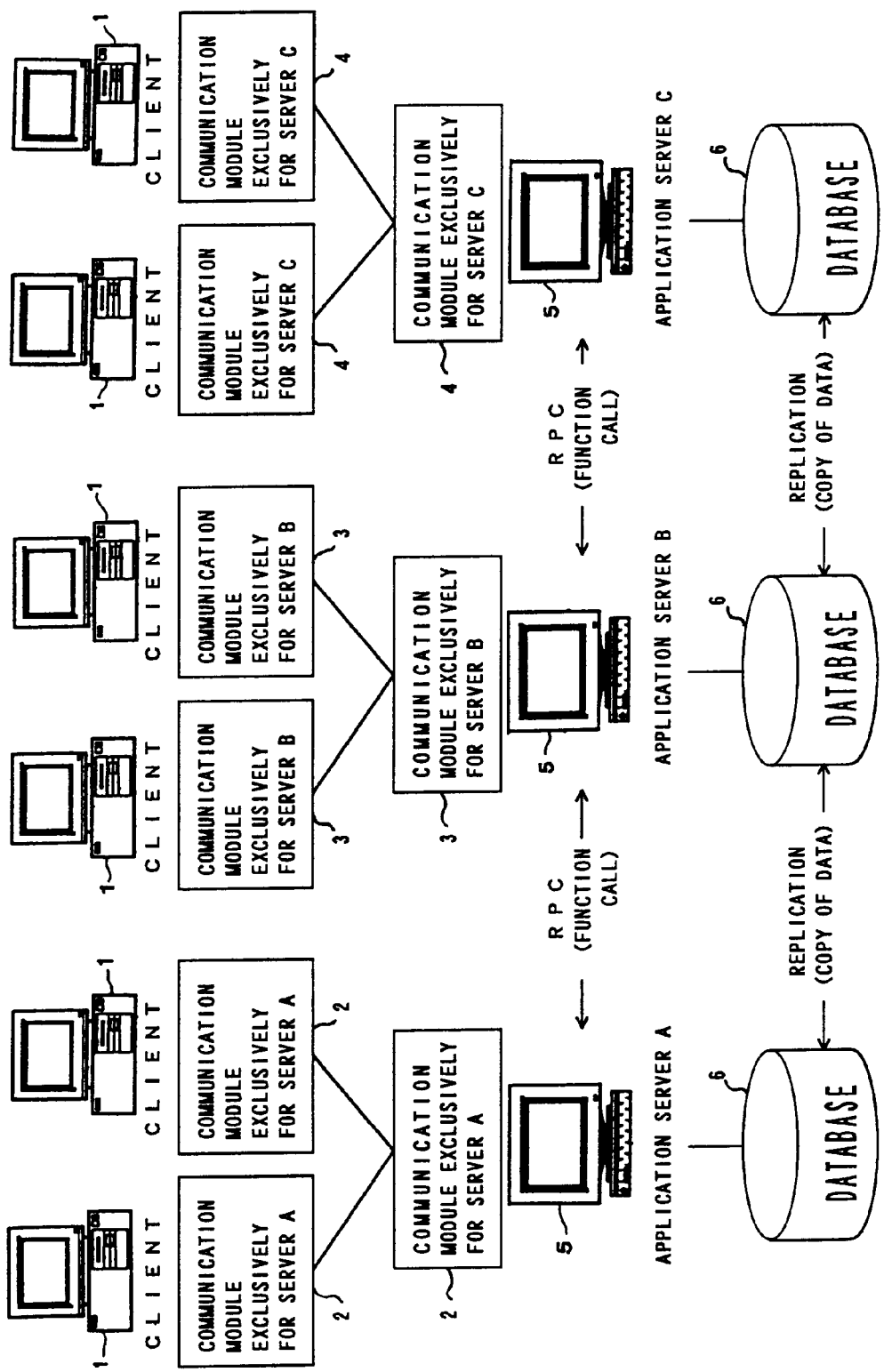
FIG. 1B is a block diagram of the conventional distributed client-server system.
Figure 1C:
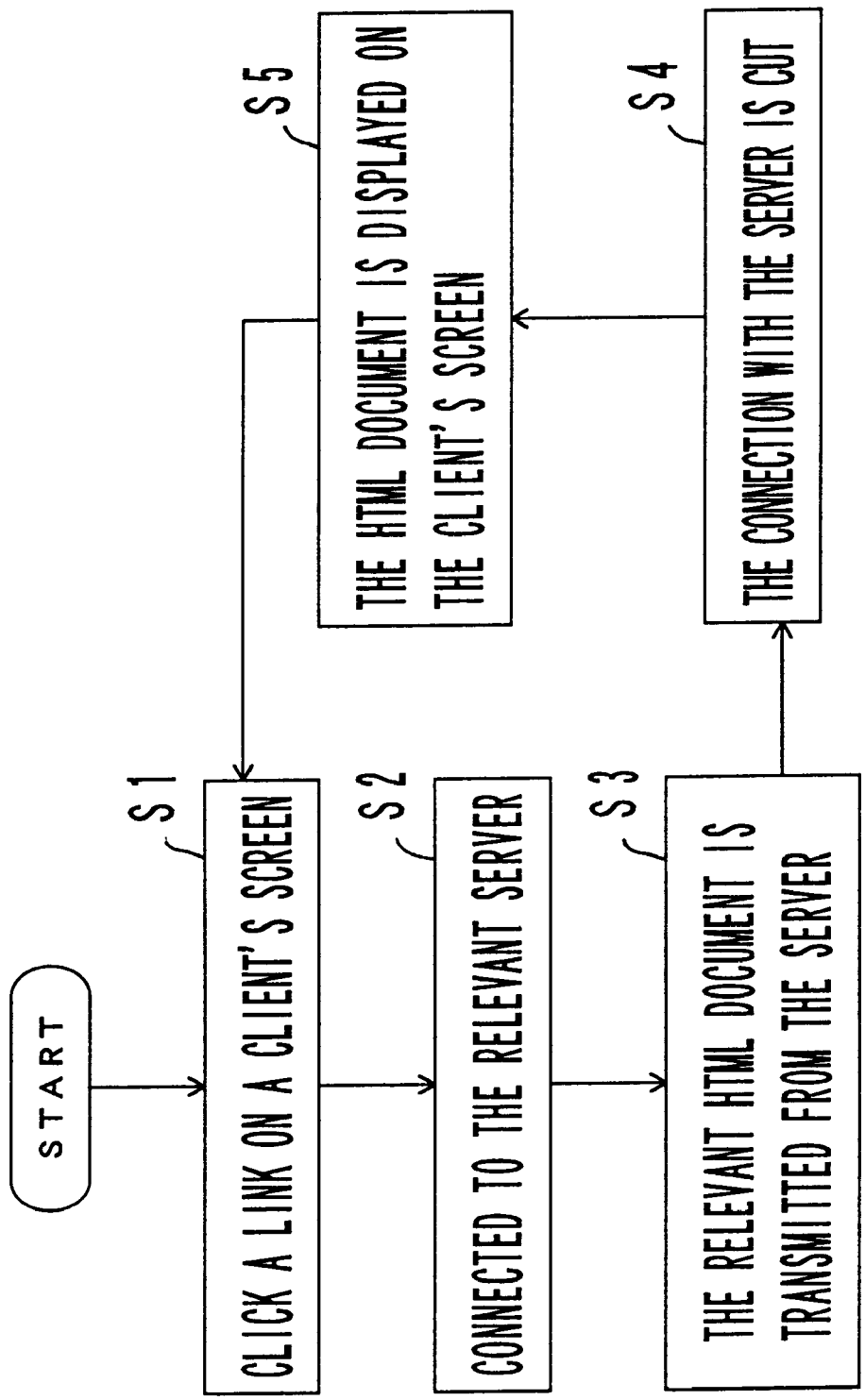
FIG. 1C is a flowchart showing the operation of a WWW system.

The details of the preferred embodiments are described below by referring to the drawings.

Figure 2A:
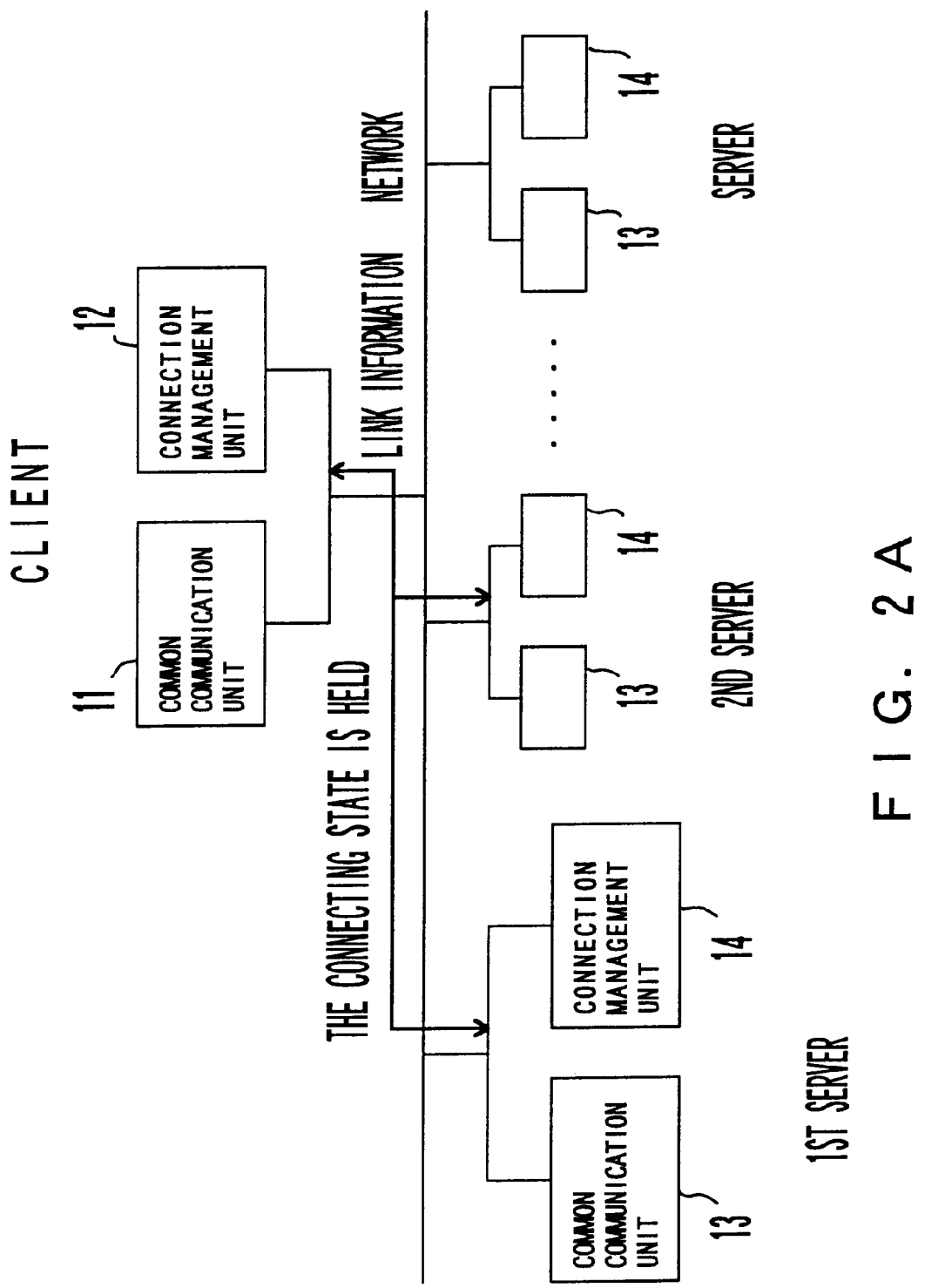
FIG. 2A is a drawing showing the principle of the network computing system of the present invention.

FIG. 2A is a drawing showing the principle of the network computing system of the present invention. The network computing system in FIG. 2A manages distributed data in a distributed system through a communication network.

In the first principle of the present invention, a client side is provided with a common communication unit 11 and a connection management unit 12. The common communication unit 11 controls the communication between a client and a plurality of servers on the network, and can access the plurality of servers commonly. When the client is connected to the first server out of the plurality of servers, the connection management unit 12 connects the client to the second server out of the plurality of servers while it is connected with the first server, and enables the client to receive services from the second server.

The common communication unit 11 is not for communication with a specific server as it is conventionally, but can communicate with all the servers on the network commonly. For example, it is assumed that it has become necessary to ask the second server for a process when a client is connected to the first server under the control of the common communication unit 11. In this case the client is connected to the second server under the control of the connection management unit 12 while it is still connected with the first server, and receives services from the second server.

According to the first principle, the client is connected to a required server not through a specific server, but directly, and can receive services such as information providing, etc. The request for the processing between servers accompanying the update and addition of data is also made automatically through the client.

In the second principle of the present invention, a server side is also provided with a common communication unit 13 and a connection management unit 14. The common communication unit 13 controls the communication between the first server and the client on the network, and receives the access from the client. The connection management unit 14 connects the client to the second server, if necessary, while it holds the connecting state with the first server of the client, and sends out link information for receiving services from the second server to the client.

The common communication unit 13 does not correspond exclusively to each server as it is conventionally, but is common to all the servers on the network. For example, it is assumed that it has become necessary to ask the second server for a process when a client is connected to the first server under the control of the common connection unit 13. In this case, link information for accessing the second server is sent to the client under the control of the connection management unit 14. The client is connected to the second server while it is still connected with the first server, and the client receives services from the second server.

According to the second principle, the client can access any server on the network and receive services such as information providing, etc. by receiving link information representing a link to the next server from the connected server. In the same way as in the first principle, the request for the processing between servers accompanying the update and addition of data is also made automatically through the client.

In this way, if the system of the present invention is used, basic communication between servers becomes unnecessary, and the communication control on the server side becomes simple. Accordingly, a large-scale distributed system can be comparatively easily constructed.

Figure 2B:
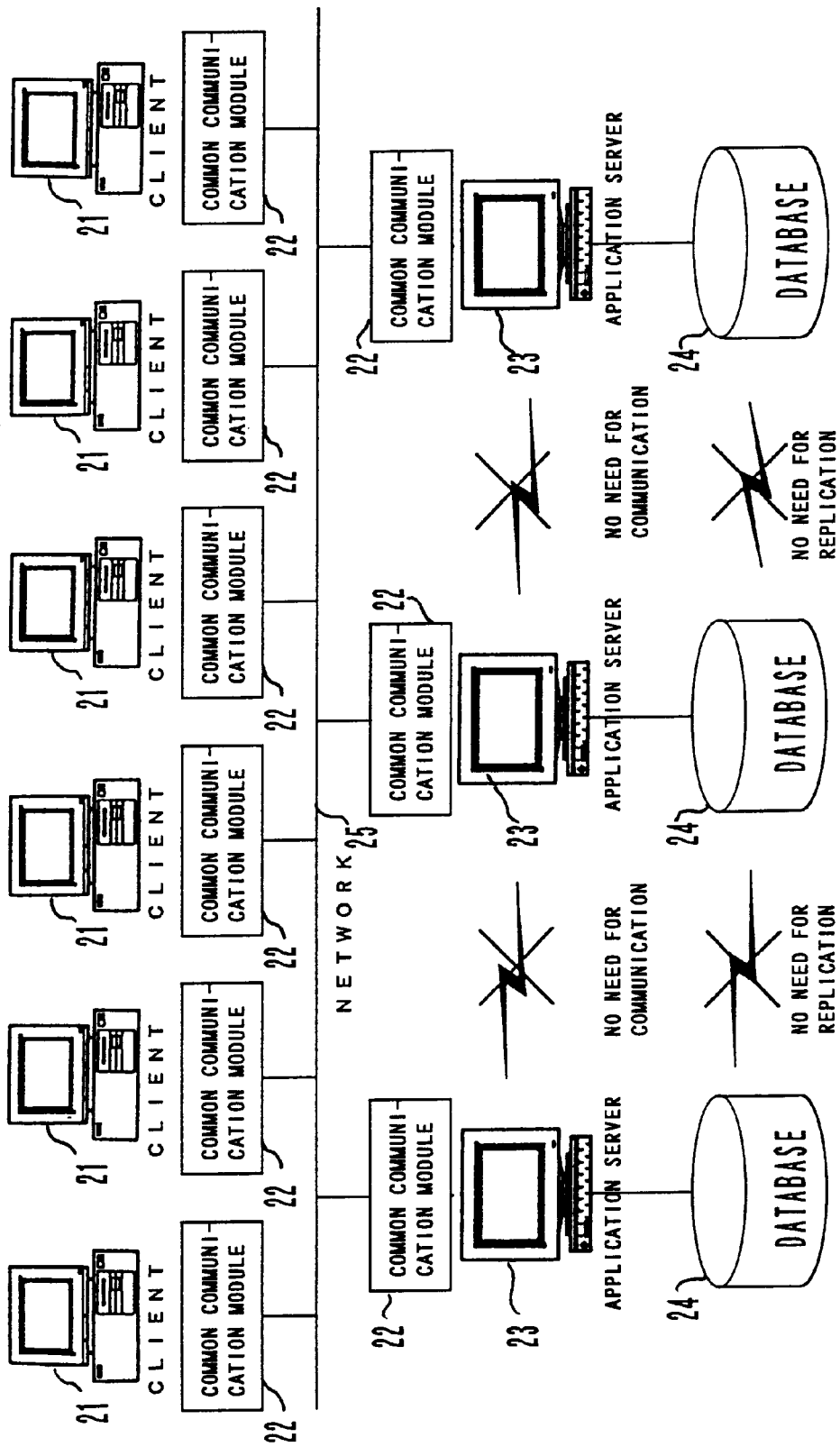
FIG. 2B is a block diagram of the network computing system.

For example, the common communication units 11 and 13 in FIG. 2A correspond to the common communication modules 22 of a client 21 and a server 23 in FIG. 2B, respectively. The connection management units 12 and 14 correspond to the connection management modules 41 of a client 21 and a server 23 in FIG. 4, respectively.

FIG. 2B is a block diagram showing the basic architecture of the network computing system of this embodiment. In FIG. 2B each client 21 and each application server 23 are united by a communication network 25 such as LAN, etc. and include a common communication module 22. Each server 23 manages each individual database 24.

In this system a client 21 may be connected to any server 23 using the common communication module 22. These servers 23, for example, can be homogeneous servers assigned to each department in a company, or heterogeneous servers, the functions of which are different from each other.

Since the client 21 uses the function of each server 23 and accesses the data of each database 24, basically there is no need for communication between the servers 23 and the replication of data between databases 24. For example, when the client 21 is first connected to a server 23, a common communication module 22 can be down-loaded to the client 21 using a JAVA (trade mark) applet.

JAVA is a network-oriented program language of an interpreter base, and a JAVA applet means a program coded in JAVA. The JAVA applet can be run in any operating system (OS). For example, it can be downloaded from the server 23 and run in the client 21.

FIG. 3 is a block diagram of the information processing apparatus used as a client 21 or a server 23. The information processing apparatus in FIG. 3 is provided with a central processing unit (CPU) 31, a memory 32, an input unit 33, an output unit 34, an external storage unit 35, a media driving unit 36 and a network connecting unit 37, and they are connected with each other by means of a bus 38.

The CPU 31 executes programs stored in the memory 32, and realizes each process of the client 21 and server 23. For the memory 32, for example, a read only memory (ROM), random access memory (RAM), etc. are used.

The input unit 33 takes the form of, for example, a keyboard, pointing device, etc., and is used to input instructions from a user. The output unit 34, for example, takes the form of a display device, printer, etc., and is used to display views to be presented to users and to output information in other formats.

The external storage unit 35 is, for example, a magnetic disk device, optical disk device, magneto-optical disk device, etc., and can store programs and data. It can be also used as a database 24.

The media driving unit 36 drives a portable recording medium 39, and accesses its memory contents. For the portable recording medium 39, an arbitrary recording medium which can be read by a computer such as a memory card, floppy disk, compact disk read only memory (CD-ROM), optical disk, magneto-optical disk, etc. can be used. This portable recording medium 39 also stores the programs for the processes of the client 21 and server 23 besides data.

The network connecting unit 37 is connected to a network 25 shown in FIG. 2B, and performs data conversions accompanying communication. The client 21 and server 23 can receive necessary information from the network 25 through the network connecting unit 37.

Next, the method of connecting the client 21 to a necessary server transparently on the network without the client being aware of a plurality of servers 23 is described below, referring to FIGS. 4 to 6. Here, to manage the data of each database 24 as objects, and to realize the connection of the client 21 to the server 23 transparently on the network, link information between the objects is used.

An object means a unit of information in an object-oriented database, and is a combination of data and a method, which is a procedure applied to the data. By executing the method defined in the object various kinds of data processing can be realized.

FIG. 4 shows the state in which the client 21 is connected to a server 23. The connection management modules 41 of the client 21, and servers A and B in FIG. 4 are included in the common communication module 22 in FIG. 2B. The link information management module 42 can also be included in the common communication module 22.

Currently it is assumed that a client 21 is connected to a server A, and information on an object 44 in the server A is displayed on the screen of the client 21 as a user view 43.

The logical ID of the object 44 is "A//001", which represents that the object ID in the server A is "001". The class to which the object 44 belongs is "organization", and its attributes are defined as an organization name of "software research department", a department code of "1111" and a phone No. of "2222".

In the object 44, as a link to the objects of "research plan" and "monthly report", that is, its reference documents, the logical ID "B//001" of an object 45 of another server B and the logical ID "C//002" of an object (not shown in the drawing) of a server C, are defined.

In this way, a link which each object holds can be set not only between objects in the same server 23, but also between objects in the different servers 23. When the client 21 accesses an object, this link information is sent from the server 23 to the link information management module 42 of the client 21 through a connection management module 41.

As the method of the object, attribute modification and work flow execution are defined. The work flow represents the operation of a work flow tool, i.e. a software for standardizing works in the organization, and here it represents the preparation work of "monthly report" by a user.

This information properties of the object 44 are presented to the user of the client 21 as a user view 43. The link information management module 42 stores a link "B//001" to a research plan document and a link "C//002" to a monthly report document, related to detail buttons 48 and 49 on the user view 43, respectively.

By a user's operation on this user view 43 the method of the object 44 in a server A can be executed, or the linked objects in other servers B and C are automatically accessed.

For example, by clicking a modify button 46 after modifying the displayed department code, the information is sent to a server A, and the method of the attribute modification of the object 44 is executed. And by clicking an execute button 47 of a work flow the work flow tool is started. The work flow tool can be in the server A or another server 23.

Figure 5:
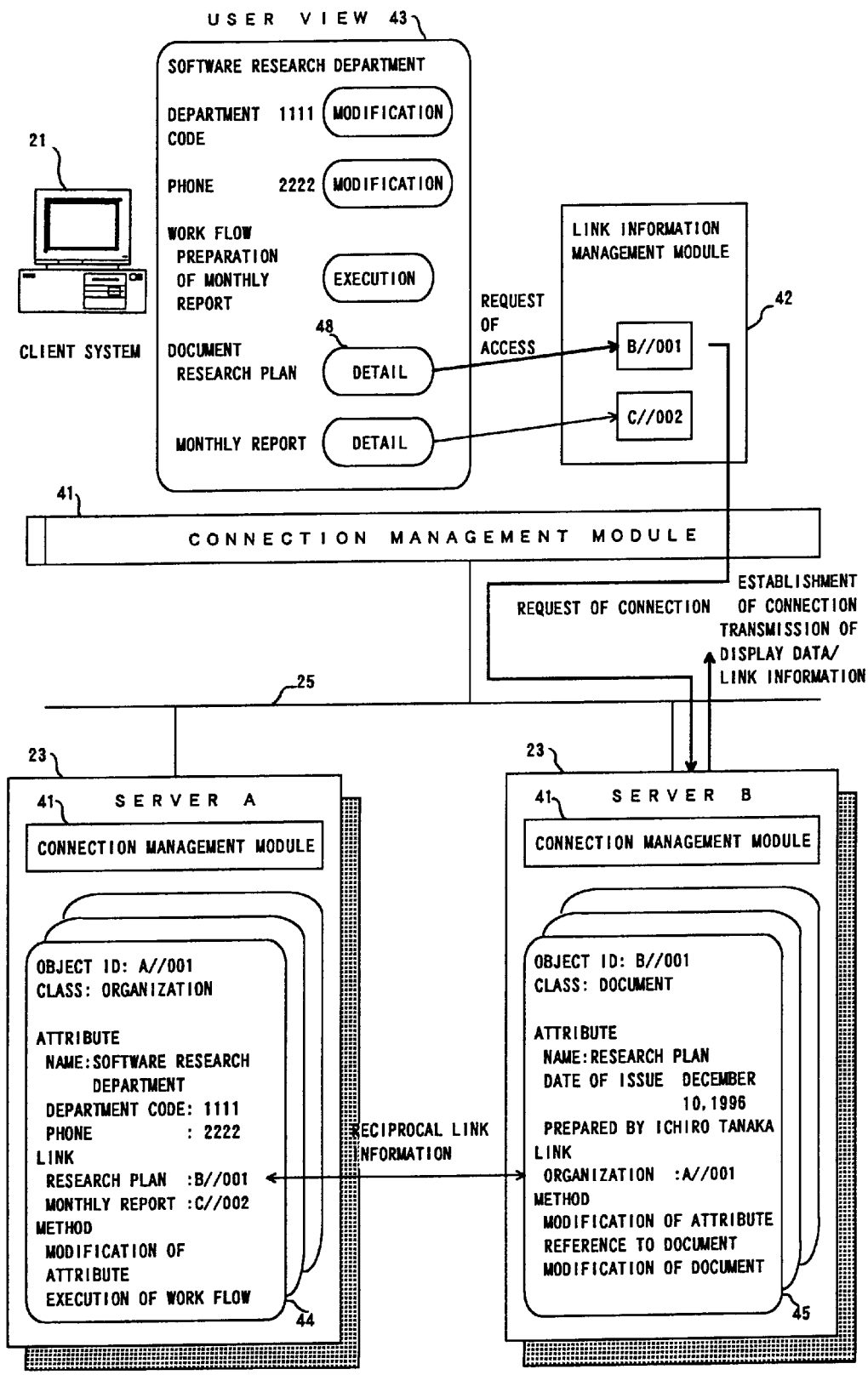
FIG. 5 is a drawing showing the access to an object in another server.

Further, by clicking the detail button 48 of a research plan document as shown in FIG. 5, an access to the object related to it is requested to the link information management module 41. In this example, since the link destination is the object 45 of a server B, a connection request is made to the connection management module 41 of the server B from the connection management module 41 of the client 21.

The connection management module 41 of the server B searches a pointer to the object 45 from the logical ID "B//001", and establishes a connection with the client 21. After the connection is established, the display data/link information relating to the object 45 are transmitted to the client 21.

Thus, the user view 43 is modified as shown in FIG. 6. In the user view 50 of FIG. 6 "document" representing the class of the object 45, "research plan" representing its name, "Dec. 10, 1996" representing its date of issue and "Ichiro Tanaka" representing its issuer are displayed.

The link information management module 42 holds the logical ID of the object 44 representing the organization to which the object 45 belongs, as a link related to the detail button 54, the organization to which it belongs.

When a modify button 51, a refer button 52 and a modify button 53 are clicked in a user view 50, methods of an attribute modification, a document reference and a document modification of an object 45 are executed, respectively.

When a detail button 54 is clicked, the information on the object 44 in a server A is displayed again. In this way the link "B//001" of the object 44 and the link "A//001" of the object 45 configure reciprocal link information in which each other is referred to as a link destination.

In this way, in the system of this embodiment, the session between a client 21 and a server A, and the session between a client 21 and a server B are managed as one connecting state (context). Here, a connecting state means the communicating state in which an execute request of a method and the executed result of the method can be exchanged between the objects in the servers A and B.

By sending out a method execute request from the server A to the server B through the client 21 the client 21 can receive services from the server B without communication between the servers A and B. This is because both communication modules 22 on the client 21 and server 23 sides are standardized.

By exchanging information between multiple servers 23 through the client 21, complicated processes can be also realized on a network 25 without communication between the servers 23.

Next, methods of holding the connecting state when servers 23 are switched between each other and of exchanging information between the servers 23 through the client 21 are described below. For example, it is assumed that when a certain server 23 is switched over to another server 23, a user ID, password and supplementary information such as a current state, etc. are sent out to the new server. Here, a current state means information on a processing state such as what view is currently opened on the client 21, etc.

Figure 7:
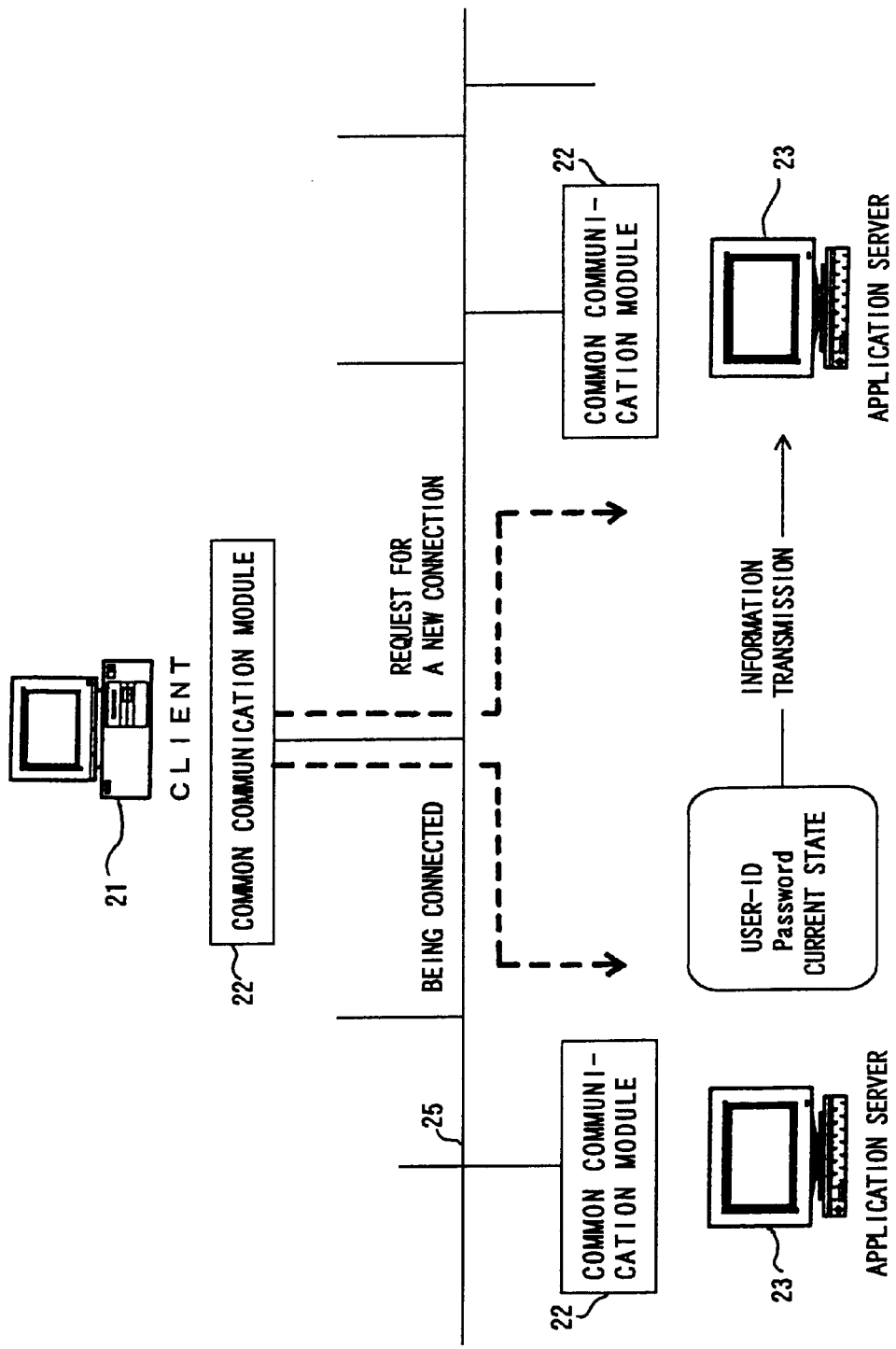
FIG. 7 is a drawing showing the first information exchange between servers.

First, as shown in FIG. 7, there is a method of connecting two servers 23 and exchanging information in the same way as the conventional client-server system. However, in this method, when accesses from multiple clients 21 are processed at the same time, too many transactions occur between the servers 23, and the process of the servers 23 becomes complicated, which has a bad effect on the functioning of the entire system.

Figure 8:
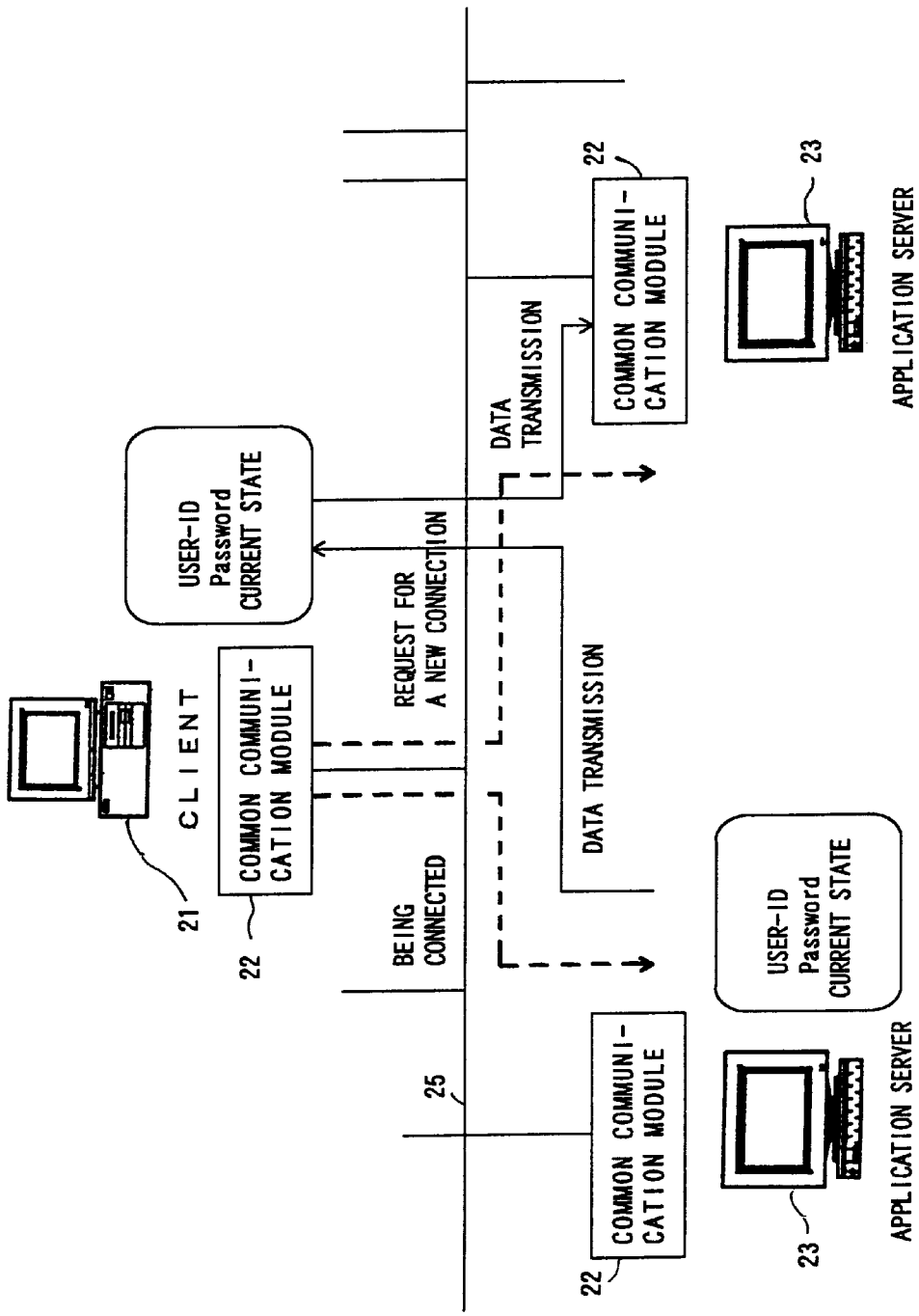
FIG. 8 is a drawing showing the second information exchange between servers.

In this embodiment, to avoid this, as shown in FIG. 8, when the client 21 sends out a new connection request to a new server 23, it also exchanges information between the servers 23. Thus, there is no complicated communication process between the servers 23, and a large-scale distributed system can be organized.

FIG. 9 shows an example of the module configuration in a network computing system. However, in the system of FIG. 9, the common communication module 22 and connection management module 41 described above are omitted, and a management server 61 is provided on the network 25 for managing other servers 23.

The management server 61 is connected to a management server database 62 having directory information 66 and class definition information 67, and comprises a directory information management module 63, a class information management module 64 and a new server setting module 65. The directory information management module 63, the class information management module 64, and the new server setting module 65, manages directory information, manages class information and sets a new server, respectively.

Each server 23 distributed on the network 25 comprises a link setting module 70, an object generating module 71, a replication module 72 and a service module 73. Each server database 24 comprises object information 68 and replication information 69.

The object generating module 71 generates each object and stores it in a database 24 as object information 68. The link setting module 70 sets a link between objects distributed on the network 25 in the generated object information 68. The replication information 69, replication module 72 and service module 73 are described later.

The client 21 comprises the above-described link information management module 42 and a view module 74 for displaying views on the screen, and refers to, generates and updates the object in a server 23 accessing it.

Each module itself of a management server 61, a server 23 and a client 21 is managed as an object, and has its own data and method. Therefore, the function of each module can be realized by executing the method corresponding to it.

The objects generated in a server 23 are managed by the directory information management module 63 in the management server 61 using directory information 66. The directory information 66 represents information on the location of each object on the network 25, for example, as shown in FIG. 10, and holds a unique pair of the object name (or object ID) and object address for each class.

In FIG. 10, for example, it is described that an object address having an object name of "research center" is research center server//1001. This address corresponds to the logical ID of the object. A URL (Uniform Resource Locator) in the WWW, etc. can also be used as an object address. In this case, link information between objects is not managed as directory information 66.

Next, the maintenance of the link information in a server 23 is described below. Although conventionally a link between objects in a distributed network was not configured, it can be configured by introducing a concept of class.

A class means a definition of the attribute of the object and its link with another object, and this information is held as class definition information 67. A class information management module 64 creates/updates the class definition information 67.

For example, the class name of an object "research center" in FIG. 10 is "organization". In the example of the class definition information 67 in FIG. 11, a link between an organization class and an individual class is defined. These links are internally managed using a unique name or ID. Any characteristic can be defined for each link. For example, information showing that it is an indispensable link, information showing that there can be a plurality of links, etc. can be set as its characteristic.

Figure 11:
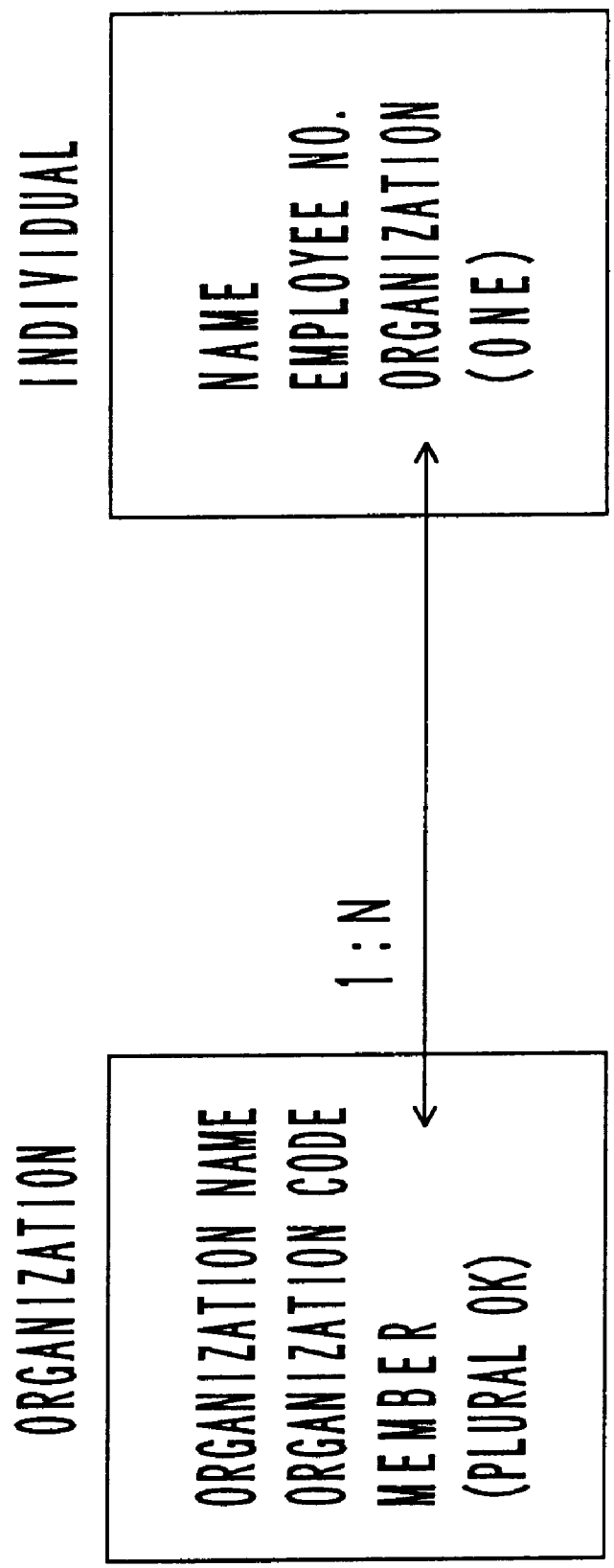
FIG. 11 shows an example of class definition information.

In FIG. 11 a relation that there are N (N≧1) members in an organization or conversely that a certain individual belongs to an organization is defined for a link. The object for which a user does not want to designate a link like this can be handled as a special root class with no link. Although a link can be defined for one direction only, in this embodiment, a bi-directional link can be also defined as shown in FIG. 11.

Various kinds of languages and graphics are proposed for class definitions like this, and the class can also define a method. In the present invention, information on a link out of various kinds of class information plays a specially important role, and its attribute and method are the same as a general object.

Figure 12:
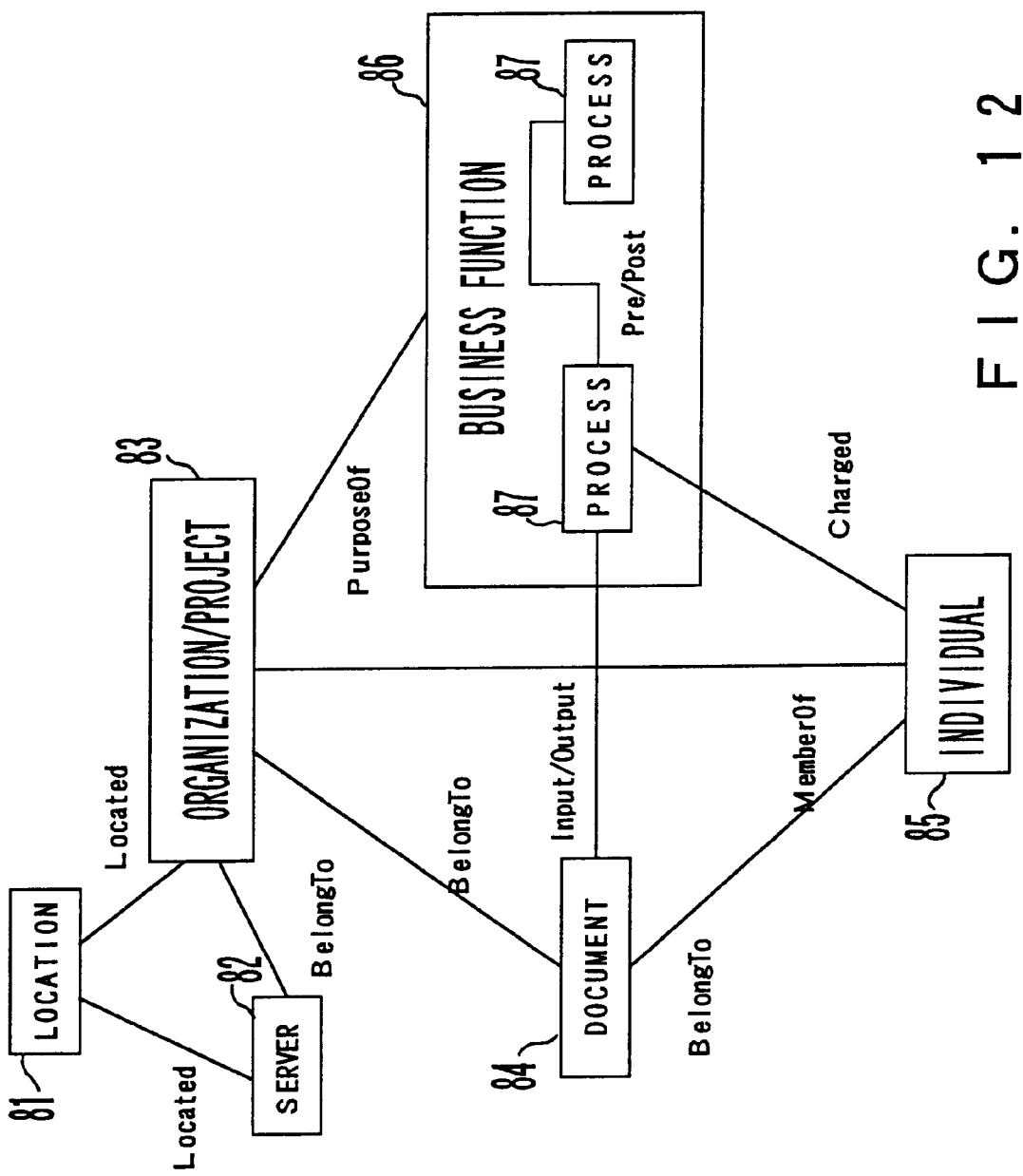
FIG. 12 shows an example of the class definition of a corporate model.

By using a link defined in a class, a hierarchical structure such as a corporate organization can be also managed. FIG. 12 shows an example expressing models of corporate activities using class definitions.

In FIG. 12, a link of "Located" is set between a location class 81 and a server class 82, and between a location class 81 and an organization/project class 83, and a link of "BelongTo" is set between a server class 82 and an organization/project class 83, between an organization/project class 83 and a document class 84, and between a document class 84 and an individual class 85, respectively.

A link of "MemberOf" is set between an organization/project class 83 and an individual class 85, and a link of "PurposeOf" is set between an organization/project class 83 and a business function class 86.

The business function class 86 includes several process classes 87, and a link of "Pre/Post" is set between process classes 87. Furthermore, a link of "Input/Output" is set between a process class 87 and a document class 84, and a link of "Charged" is set between a process class 87 and an individual class 85.

In a location class 81 and an organization/project class 83, a hierarchy can be defined as an internal structure, and a hierarchical structure can be defined between a plurality of process classes 87. By constructing and managing a corporate activity model like this in a distributed system, business efficiency and various kinds of business applications can be uniformly controlled.

Next, the detailed process of the system in FIG. 9 is described below referring to a concrete example. In the following embodiment, an example of the organization object information displayed on a WWW client is mainly used.

It is currently assumed as shown in FIG. 13 that a client 21 referring to the organization object 93 of "software research department" in the software research (software research department) server 91 has designated a link in order to refer to the information on a member "Yamada". At this time the client 21 is connected to the software development (software development department) server 92, in which an object of "Yamada" exists, by this link information, and the information of the object 94 of "Yamada" is displayed. In this case, the software research server 91 and the software development server 92 correspond to the servers 23.

By tracing link information like this, a client's operation of accessing another server 23 and displaying the data in a linked file is also performed in the conventional WWW system.

However, in the present invention, not only the data of a linked object is displayed, but also its method can be executed by a server 23. Furthermore, a server 23 can notify a client 21 of a method. In this manner, by automatically asking execution of a method between servers 23 through a client 21, a series of processes are performed transparently on the network. The request for the execution of a method for another server 23 can be realized by a method call using message transmission between objects.

As the standard specifications of a message exchange between objects in a distributed system environment, the object management group (OMG) of a common object request broker architecture (CORBA) is known. In this architecture, when a client passes a request to an object request broker (ORB) without being conscious of where its database and process program are, the ORB processes the request properly and returns the result to the client.

Here, by using the link information held in the link information management module 42 of a client 21, a method call across different servers 23 becomes possible.

When a user connected to a certain server 23 generates a new object, he or she designates a class of an object to be generated and a server 23 for storing the object, and asks the object generating module 71 of the server 23 to process it.

At this time the user can also designate information on the link for the new object at the same time. Or the object generating module 71 can be made to ask the user to designate objects necessary to be linked, based on the class information of the generated object.

In this way, when the link designation by the user finishes, the client 21 sends out object information including the link information to the server 23, and at the same time notifies a management server 61 of the registration of the new object. It also asks the objects to be linked to add link information.

A new link with another object can also be set to the existing object. For example, an organization object and a document object can be related as shown in FIG. 12. Or a new document can be created and linked with the organization object. The deletion of an object can be also realized by the same procedures.

Figure 14:
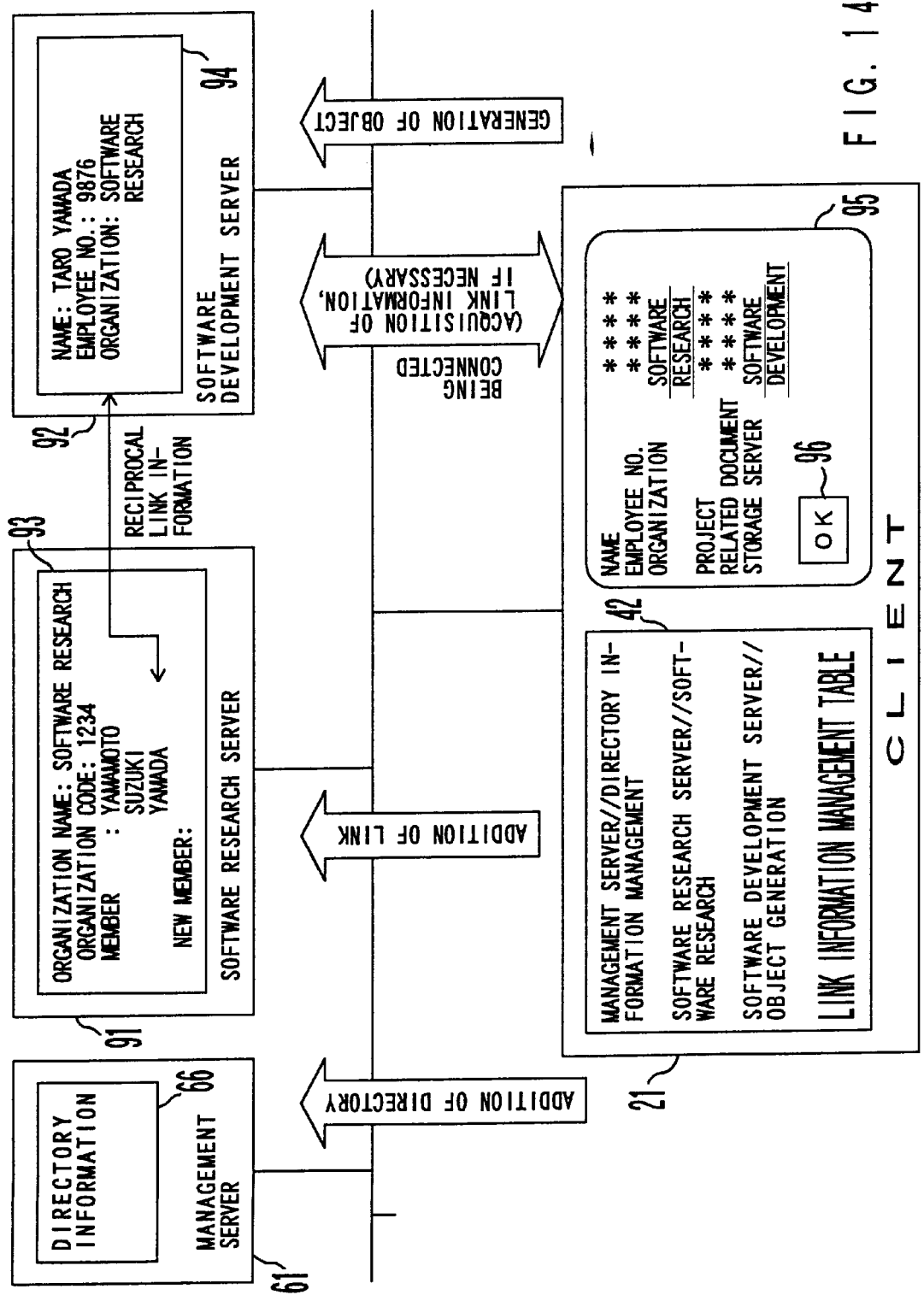
FIG. 14 is a drawing showing the creating operation of object information.

FIG. 14 shows the generating operation of a new object in the example of FIG. 13. In FIG. 14, for example, it is assumed that a client 21 accesses a software research server 91 and is displaying the information on the organization object 93 of "software research". FIG. 15 shows the user view at this time. The part underlined on the screen represents a link to another object, and by clicking on there the information on the corresponding object is displayed.

When on this screen the user clicks on the part of a new member, the generation of the object of a new member is requested to a software development server 92 through the client 21. At this time the connection management module 41 of the client 21 first obtains the link information to an object generating module 71 of "software development server//object generation" from the connection management module 41 of the software development server 92, and stores it in a link information management table in a link information management module 42.

When the definition screen 95 of a new member is displayed, the user defines the parts marked by *** if necessary, and clicks an OK button 96. Then, the client 21 asks the object generating module 71 of the connected software development server 92 to generate the individual object of a new member using the link information "software development server//object generation".

Then, the object generating module 71 generates the individual object 94 for a member "Yamada". At this time, since the organization "Yamada" belongs to is defined as "software research", a link to the organization object 93 of "software research" is automatically set.

When starting an operation, the client 21 obtains link information "management server//directory information management" to the directory information management module 63 of a management server 61, and stores it in a link information management module 42. Therefore, the client 21 asks the management server 61 to add new directory information using this link information. Thus, an object 94 is registered in the directory information 66 of the management server 61 (management server database 62) as a new object.

The client 21 also obtains a link information "Software research server//software research" to the object 93 of the software research server 91 from the individual object 94, and asks the object 93 to add a link. Thus, a link to the individual object 94 of "Yamada" is set for the member item of the object 93, and a new member name of "Yamada" is displayed additionally on the screen of the object 93 of the "software research" of the client 21.

Here, the generation of a new object and the addition of the directory information and link accompanying it are realized as a client 21 led process. However, the addition of the directory information and link can be also performed in the form of a request from a software development server 92 to both the management server 61 and the software research server 91 through the client 21.

When the user registers a new server 23, it asks a new server setting module 65 of the management server 61 to process it. The requested new server setting module 65 loads the new server 23 with the necessary modules such as a link setting module 70, object generating module 71, etc.

When adding the server, an object of a server class 82, i.e., the special object class shown in FIG. 12, is also generated. By storing the address of the server 23 on the network 25 in this object, the server 23 is registered in the management server 61. For the address any one such as an internet protocol (IP) address, URL, etc. can be used.

When the new server 23 has been registered, no object exists in the server 23, but all the objects in the distributed environment can be accessed through the management server 61.

Next, services provided by service module 73 in FIG. 9 such as user management, retrieval, etc. are described below. By providing this service module 73, the above-described individual object can be used for user management.

When a new user is registered, it generates an individual object for user management, and stores its user information such as a password, etc. there. This individual object is managed by the management server 61, and when the user logs onto the system from another server 23 in which the individual object does not exist, the management server 61 accesses the object and performs user authorization, etc.

The information of an object and a link can be also used for a log-in screen when the user logs onto the system. For example, as shown in FIG. 12, the links to organization/project, document and process are defined from the individual object. For this reason the link to the organization and project to which the user belongs, the document of the user and the assigned process, can be displayed on the log-in screen.

FIG. 16 shows an example of a log-in screen such as this. When the user clicks "software research" and "browser development" or "server development" on this screen, the information on the organization object 93 of "software research" and the information on the corresponding project object respectively are displayed. When "department meeting material" or "development specifications" is clicked, the information on the corresponding document object is displayed.

Furthermore, the service module 73 also provides retrieval services. Since a link among objects is configured as a relation between classes as shown in FIG. 12, by tracing it such an object as to satisfy a certain condition can be retrieved. For example, by referring to the link between an organization/project class 83 and a document class 84 all "minutes" belonging to "software research" can be retrieved and displayed.

Since the retrieval tool of the conventional WWW system performs a round robin retrieval, retrieval takes a considerable time. On the other hand, in the present invention, intelligent retrieval based on a relation between classes is available, and retrieval can be processed efficiently.

In the embodiment described so far, generally speaking, when all the objects on the network 25 are registered in the management server 61, its data volume becomes enormous. Therefore, it has been considered to avoid the deterioration of process efficiency due to a huge amount of directory information 66 by registering only a part of objects in the management server 61. For example, it is configured so that only objects positioned in higher level may be registered in the management server 61 according to their class information, and that objects positioned in lower level may be reached by tracing their links.

In the example of FIG. 12, for example, only objects of a server class 82, organization/project class 83 and individual class 85 are registered in the management server 61. Although, generally speaking, the number of objects of a document class 84 becomes very large, they can be accessed by tracing their links from the objects of the organization/project class 83 and individual class 85.

Furthermore, the directory management by the management server 61 itself can be also cancelled. In this case the replication module 72 in FIG. 9 replicates only information on the objects of a server class 82 between all servers 23.

The replicated information on the class and object is stored in the database 24 of each server 23 as replication information 69. Thus, the information on the location of each server 23 on the network 25 is commonly shared by all servers 23.

Further, each object is made to have a link with the server object of the server 23 to which it belongs. Thus, each object can access all other objects through the server object.

Since on the network 25 the addition of a server 23 does not occur so frequently as a data update, there is no need for replicating the server object so frequently. Therefore, if this replication process is executed directly between servers 23, the efficiency of the entire system is not deteriorated so much.

When the load of the management server 61 is heavy, by replicating part of or all directory information 66 to each server 23, access to each object can be sped up. This process is also executed by a replication module 72, and the replicated information is stored in a database 24 as replication information 69.

The same replication process is also available for each object, which can speed up the access to each object. In this case a link is set between the master object to be copied and the replica (copy) of the object.

When modification of the information on the replica is requested by the client 21, the server is automatically switched over and connected to a server 23 having the master object, and the master object is updated. Then, by the replication function, the modification of the master object is reflected in another object, that is, replica.

Next, the detailed operation of the network computing system is described below referring to FIGS. 17 and 18.

FIG. 17 ia a flowchart showing the general operation of the network computing system. First, with a user interaction such as a client 21's user clicking a button, etc. (step S11), a view module 74 asks an object in a server 23 to execute its method (step S12), if necessary. At this time the logical ID of the requested object (including its server name) is retrieved by a link information management module 42.

Then, the connection management module 41 of the client 21 judges whether or not it is connected to the requested server 23 by referring to the logical ID (step S13), and if not, it executes the connection process and notifies the client 21 of a request to execute its method (step S14).

Then, the connection management module 41 of the server 23 retrieves the requested object according to the logical ID by referring to an object management table (step S15). The object management table has information for converting the logical ID of each object to an object pointer. For example, it is stored in the connection management module 41. In this way the retrieved object executes the requested method.

Here, it is checked if there is a request for executing a method of another object while executing the method (step S16), and if there is a request, it asks the client 21 being connected to execute the method (step S17). Thus, the operations in and after step S13 are repeated.

When there is no request to execute another method while executing the method and the execution terminates, various kinds of notification and data transmission are executed for related clients 21 by the server 23 (step S18). At this time information on the objects modified/added by the method execution, etc. is sent to the client 21.

The view module 74 of the client 21 modifies the view using the received information (step S19), and also modifies/adds the link information in a link information management module 42 (step S20), if necessary. Thus, when a new user interaction occurs on the modified screen (step S11), the operations in and after step S12 are repeated.

Figure 18:
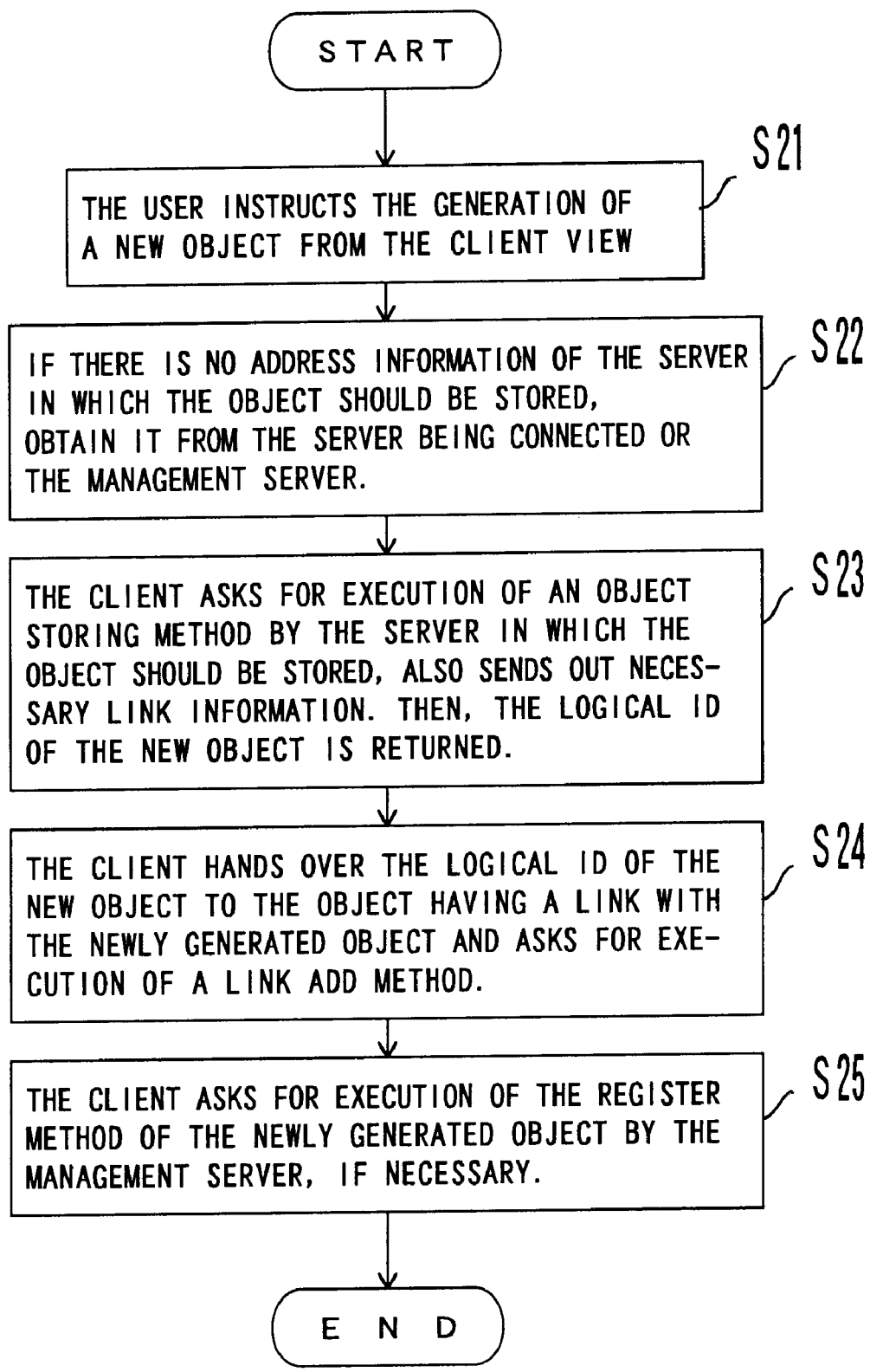
FIG. 18 is a flowchart showing the generation processing of a new object.

FIG. 18 is a flowchart showing the generation processing of a new object. First, a user instructs the generation of a new object as shown in FIG. 14 on the view of a client 21 (step S21). At this time, if the connection management module 41 of the client 21 does not have the address information on the server 23 in which the object should be stored, it obtains the address information from the server 23 being connected or a management server 61 (step S22).

Then, the connection management module 41 sends out necessary information to the object generating module 71 of the server 23 in which the object should be stored, and asks it to execute an object storing method (step S23). Then, the object generating module 71 generates a new object including its link information, stores it in a database 24 and returns its logical ID to the client 21.

Then, the client 21 hands over the logical ID of the new object to another object having a link with the newly generated object and asks the execution of a link add method (step S24). The object having received this request adds the logical ID as a new link.

The client 21 then asks the directory information management module 63 of the management server 61 to execute the register method of the new object (step S25), if necessary. Then, the directory information management module 63 adds the class name, object name, address information, etc. of the new object to a directory information 66, and a series of the processes finishes.

In this way, in the present invention, a method call is made through a client by sending link information from a server side to a client side, if necessary. Therefore, the communication needed between servers can be performed under the lead of the client, which eliminates the conventional complicated communication control.

As a matter of fact, most of the data updating of a server on a network occurs due to the access by a client. At this time, since the server is already connected with the client, communicating through the client that is connected is more reasonable than establishing a new connection with another server. The present invention provides a framework for the client-led communication between servers like this.

According to the present invention, addition and update of information, setting a link between information, etc. can be performed easily on a distributed system. Therefore, it can be possible to construct a huge scale distributed information system or corporate model which was difficult before.

What is claimed is:

1. A network computing system for managing information in a distributed system through a communication network, comprising:

a common communication device controlling a communication between a client and a plurality of servers on the network, said common communication device being able to commonly and transparently access the plurality of servers and a first server transmits link information to the client; and a connection management device connecting the client, when the client is connected with the first server out of the plurality of servers, to a second server out of the plurality of servers by using the link information transmitted from the first server to the client, if necessary, while holding a connecting state between the client and the first server, and for enabling the client to receive a service from said second server.

2. The network computing system according to claim 1, further comprising on a client side:

a link information management device receiving link information between information in the first server and information in the second server from the first server and managing the link information, wherein the connection management device connects the client to the second server transparently on the network using the link information stored in the link information management device.

3. The network computing system according to claim 2, wherein the plurality of servers realize complicated processes on the network by exchanging information using the link information management device of the client.

4. The network computing system according to claim 1, wherein the connecting state represents a state in which a request to execute a method can be transmitted between an object in the first server and an object in the second server, and the client receives the service from the second server without communicating between the first and the second server by sending a request to execute a method from the first server to the second server through the client.

5. A network computing system for managing information in a distributed system through a communication network, comprising:
  a common communication device controlling a communication between a first server and a client on the network and transparently receiving an access by the client; and
  a connection management device transmitting from the first server to the client link information for connecting the client to a second server, if necessary, while holding a connecting state between the client and the first server and enabling the client to receive a service from the second server.

6. The network computing system according to claim 5, further comprising in an arbitrary server distributed on the network:
  an object generating device generating an object; and
  a link setting device generating a link between objects, wherein the connection management device transmits information relating to a link between an object in the first server and an object in the second server to the client as the link information.

7. The network computing system according to claim 6, wherein the link setting device generates a bi-directional link.

8. The network computing system according to claim 6, further comprising:
  a class information management device storing class definition information for defining a relation between classes of the objects and managing the link between the objects based on the class definition information.

9. The network computing system according to claim 8, wherein the class information management device holds the class definition information having ta hierarchical structure between the classes.

10. The network computing system according to claim 9, wherein the class information management device defines at least one class out of organization, individual, process and document related to a corporate activity, and constructs a corporate model in the distributed system.

11. The network computing system according to claim 6, further comprising:
  a director information management device storing directory information relating to a location of each object on the network and managing the directory information.

12. The network computing system according to claim 11, wherein the directory information management device reduces a volume of the directory information by holding directory information of a party of objects.

13. The network computing system according to claim 11, further comprising:
  a replication device replicating a part of the directory information between servers.

14. The network computing system according to claim 6, further comprising:
  a replication device replicating a part of objects in each server between servers.

15. The network computing system according to claim 14, further comprising:
  a switching device automatically switching over a connection to a master object of a replicated object and updating the master object when updating the replicated object.

16. The network computing system according to claim 6, further comprising:
  a device making servers share information relating to a location of each server on the network and managing each object using the information relating to the location.

17. The network computing system according to claim 6, further comprising:
  a new server setting device registering a new server having the object generating device and link setting device.

18. The network computing system according to claim 6, further comprising:
  a device managing a suer of the distributed system using an object relating to user information.

19. The network computing system according to claim 6, further comprising:
  a device performing an information retrieval service using the link information.

20. A computer-readable recording medium in which a program for managing information in a distributed system through a communication network is recorded, the program directing a computer to perform:
  controlling a communication between a client and a plurality of servers on the network and commonly and transparently accessing the plurality of servers; and
  connecting the client, when the client is connected with a first server out of the plurality of servers and a first server transmits link information to the client, to a second server out of the plurality of servers by using the link information transmitted from the first server to the client, if necessary, while holding a connecting state between the client and the first server and enabling the client to receive a service from the second server.

21. A computer-readable recording medium in which a program for managing information in a distributed system through a communication network is recorded, the program directing a computer to perform:
  controlling a communication between a first server and a client on the network and transparently receiving an access by the client; and
  transmitting from the first server to the client link information for connecting the client to a second sever, if necessary, while holding a connecting state between the client and the first server and enabling the client to receive a service from the second server.

22. A network computing method for managing information in a distributed system through a communication network, comprising:
  controlling a communication in such a way that a client on the network commonly and transparently accesses a plurality of servers on the network;
  controlling a communication so as to connect the client, when the client is connected with a first server out of the plurality of servers and the first server transmits link information to the client, to a second server out of the plurality of servers by using the link information transmitted from the first server to the client, if necessary, while holding a connecting state between the client and the first server; and enabling the client to receive a service from the second server.

23. The network computing method according to claim 22, wherein the link information is transmitted from the first server to the client for receiving the service from the second server.

24. A network computing system for managing information in a distributed system through a communication network, comprising:

a common communication device controlling a communication between a first server and a client on the network and transparently receiving an access by the client a connection management device transmitting from the first server to the client link information for connecting the client to a second server, if necessary, while holding a connecting state between the client and the first server and enabling the client to receive a service from the second server;

a replication device replicating a part of objects in each server between servers, a switching device automatically switching over a connection to a master object of a replicated object and updating the master object when updating the replicated object;

an arbitrary server distributed on the network comprising:
an object generating device generating an object; and
a link setting device generating a link between objects, wherein the connection management device transmits information relating to a link between an object in the first server and an object in the second server to the client as the link information.

25. A method allowing a client connected to a first application server to access a database accessible to a second application server, comprising:

requesting, by the client, access to a database accessible by the second application server;

transmitting link information from the first server to the client; and connecting, using the link information, to the second application server transparently to access the database, while maintaining a connecting state between the client and the first application server.

26. A computer readable storage medium storing a program to instruct a computer to perform a method allowing a client connected to a first application server to access a database accessible to a second application server, comprising:

requesting, by the client, access to a database accessible by the second application server;

transmitting link information from the first server to the client; and connecting, using the link information, to the second application server transparently to access the database, while maintaining a connecting state between the client and the first application server.

27. An apparatus comprising:

a common communication device transparently connecting a client to a plurality of servers; and a connection device transparently connecting the client to a second server using the common communication device while the client is connected to a first server, by using link information transmitted from the first server to the client.

* * * * *

UNITED STATES PATENT AND TRADEMARK OFFICE
CERTIFICATE OF CORRECTION

PATENT NO.   : 6,199,111 B1
DATED        : March 6, 2001
INVENTOR(S)  : Hirotaka Hara, et al.

Page 1 of 1

It is certified that error appears in the above-identified patent and that said Letters Patent is hereby corrected as shown below:

<u>Column 15,</u>
Line 46, change "ta" to -- a --.

Signed and Sealed this

Sixteenth Day of October, 2001

Attest:

NICHOLAS P. GODICI
Attesting Officer
Acting Director of the United States Patent and Trademark Office